United States Patent
Feng et al.

(10) Patent No.: US 7,321,629 B2
(45) Date of Patent: Jan. 22, 2008

(54) METHOD AND APPARATUS FOR PROTECTING AND TRANSMITTING THE SIDE INFORMATION RELATED TO PEAK-TO-AVERAGE POWER RATIO REDUCTION IN A MULTICARRIER SYSTEM

(75) Inventors: Chih-Chun Feng, Yun Lin (TW); Yung-Hua Hung, Hsinchu (TW); Chih-Yaw Wang, Chang Hua (TW); Chun-Yu Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 801 days.

(21) Appl. No.: 10/613,419

(22) Filed: Jul. 3, 2003

(65) Prior Publication Data

US 2004/0146115 A1 Jul. 29, 2004

(30) Foreign Application Priority Data

Jan. 24, 2003 (TW) .............................. 92101624 A

(51) Int. Cl.
*H04K 1/10* (2006.01)
*H04L 27/08* (2006.01)
(52) U.S. Cl. ...................................... 375/260; 375/259
(58) Field of Classification Search ................ 375/259, 375/285, 341, 346, 348, 350, 360, 260; 370/208, 370/431, 331, 335; 455/522
See application file for complete search history.

(56) References Cited

U.S. PATENT DOCUMENTS

| 6,445,747 B1 * | 9/2002 | Jafarkhani et al. .......... 375/285 |
|---|---|---|
| 6,556,557 B1 * | 4/2003 | Cimini et al. ............... 370/342 |
| 6,717,990 B1 * | 4/2004 | Abousleman ............... 375/265 |
| 6,888,804 B1 * | 5/2005 | Moon .......................... 370/311 |
| 6,961,369 B1 * | 11/2005 | Tzannes ...................... 375/220 |
| 7,126,980 B1 * | 10/2006 | Breiling ....................... 375/146 |
| 2002/0140586 A1 * | 10/2002 | Bruekers et al. ............ 341/107 |
| 2002/0150036 A1 * | 10/2002 | Weerackody ............... 370/208 |
| 2002/0176509 A1 * | 11/2002 | Gatherer et al. ............ 375/260 |
| 2003/0142754 A1 * | 7/2003 | Jung et al. ................... 375/260 |
| 2003/0231581 A1 * | 12/2003 | Son ............................. 370/208 |
| 2004/0086054 A1 * | 5/2004 | Corral ......................... 375/260 |
| 2005/0018702 A1 * | 1/2005 | Chen et al. ................. 370/431 |

OTHER PUBLICATIONS

Weissman et al., On Casual Source Codes With Side Information, Nov. 2005, Information Theory, IEEE Transactions on, vol. 51, Issue 11, pp. 4003-4013.*

(Continued)

*Primary Examiner*—Mohammed Ghayour
*Assistant Examiner*—Lawrence Williams

(57) ABSTRACT

A low-complexity and low-latency method and apparatus in multicarrier communication systems is used for protection and transmission of the side information related to peak-to-average power ratio (PAPR) reduction. The side information is encoded by an error-correction code and transmitted through a plurality of reserved sub-carriers. Modulation of the coded side information over the reserved sub-carriers is performed separately without re-performing data modulation. Therefore, the invention dramatically reduces implementation complexity. Determination of the related parameters for PAPR reduction can be based on the PAPR level of the data modulated signal with slight degradation in PAPR reduction performance or that of level of the transmitted signal with no degradation in PAPR reduction performance.

32 Claims, 18 Drawing Sheets

OTHER PUBLICATIONS

Feng et al., Protection and Transmission of Side Information for Peak-to-Average Power Ratio Reduction of an OFDM Signal Using Partial Transmit Sequences, Oct. 6-9, 2003, Vehicular Technology Conference, vol. 4, pp. 2461-2465.*

S.H. Müller and J.B. Huber, "A novel peak power reduction scheme for OFDM,"Proc.PIMRC'97,pp. 1090-1094.

S.H. Müller and J.B. Huber, "OFDM with reduced peak-to-average power ratio by optimum combination of partial transmit sequences,"Electronics Letters, vol. 33, No. 5, pp. 368-369, Feb. 1997.

L.J. Cimini, Jr. and N.R. Sollenberger, "Peak-to-average power ratio reduction of an OFDM signal using partial transmit sequences with embedded side information,"Proc.GLOBECOM'00,pp. 746-750.

L.J. Cimini, Jr. and N.R. Sollenberger, "Peak-to-average power ratio reduction of an OFDM signal using partial transmit sequences," Proc. ICC'99, pp. 511-515.

* cited by examiner

METHOD AND APPARATUS FOR PROTECTING AND TRANSMITTING THE SIDE INFORMATION RELATED TO PEAK-TO-AVERAGE POWER RATIO REDUCTION IN A MULTICARRIER SYSTEM

FIELD OF THE INVENTION

The present invention generally relates to the field of peak-to-average power ratio (PAPR) reduction in multicarrier communication systems, such as discrete multitone (DMT) and orthogonal frequency division multiplexing (OFDM) communication systems, and more particularly to a method and apparatus for protection and transmission of the side information related to PAPR reduction in multicarrier communication systems.

BACKGROUND OF THE INVENTION

Multicarrier communication systems, including the most commonly used DMT and OFDM communication systems, have attracted considerable attention in a variety of high-speed communication applications, including digital subscriber line (DSL), digital terrestrial broadcasting, wireless local area network (WLAN), wireless metropolitan area network (WMAN), dedicated short range communication (DSRC), power line communication, and so on. They also show promise as future generation of mobile communication systems. The advantage of multicarrier communication systems comes from dividing high-speed data stream into multiple parallel portions of data streams transmitted via individual sub-carriers. Each portion of data stream is transmitted at a lower speed and thus robust against the effects of channel impairments such as multipath fading and impulse noise.

FIG. 1 is a simplified block diagram illustrating a typical OFDM transmitter. As can be seen from the OFDM transmitter, data X[k], k=0, 1, . . . , N−1, to be transmitted within an OFDM symbol period, are transformed via a serial/parallel (S/P) converter 10, an N-point inverse fast Fourier transform (N-IFFT) 20, and a parallel/serial (P/S) converter 30 into the following baseband transmitted signal:

$$x[n] = \frac{1}{\sqrt{N}} \sum_{k=0}^{N-1} X[k] W_N^{kn}, \quad n = 0, 1, \ldots, N-1 \quad (1)$$

where $$W_N = e^{j2\pi/N} \quad (2)$$

is the twiddle factor. The discrete-time transmitted signal x[n] given by (1) is then inserted with cyclic prefix followed by digital-to-analog (D/A) conversion, and the resultant analog signal x(t) is sent to RF front end for further processing including in-phase/quadrature-phase (I/Q) modulation, up conversion and power amplification.

It is known that the PAPR of the analog signal x(t) is higher than that of the discrete-time counterpart x[n] by several dB, and can be approximated by that of x[n/R] where x[n/R] denotes the signal taken from R times oversampling of x[n]. Note that the cyclic prefix insertion 40 has no any effect on the PAPR level of x(t). Thus, it is convenient to evaluate the PAPR level of x(t) in terms of that of x[n/R] given by $$PAPR = \frac{\max_{0 \le n \le RN-1} |x[n/R]|^2}{E\{|x[n/R]|^2\}} \quad (3)$$

where E{ } denotes expectation operation. Typically, the approximation is quite accurate for R≧4.

One major drawback of multicarrier communication systems is the high PAPR of the baseband transmitted signal x(t). When passing through an RF front end without sufficient power back-offs, the signal x(t) will be distorted by the nonlinearity of RF power amplifier. In particular, the nonlinearity will incur not only the in-band signal distortion leading to bit-error-rate (BER) performance degradation, but also the out-of-band radiation (or spectrum re-growth) leading to adjacent channel interference and violation of government's spectrum regulation.

Conventional solution to this problem is simply utilizing a power amplifier with large linear range and large power back-offs at the expense of low power efficiency, high power consumption, and high manufacturing cost. Alternatively, the problem can be resolved by using PAPR reduction approaches. One of the PAPR reduction approaches is block-coding approach, which tries to find out a coding rule so that all the encoded codewords result in very low PAPR levels for the transmitted signal x(t). However, extremely low code rate and extraordinary encoding/decoding complexity make the approach only suitable for systems with small constellation size and small number of sub-carriers.

Another PAPR reduction approach is deliberately clipping approach. In this approach, those amplitude levels of the transmitted signal exceeding a certain threshold are clipped, and the clipped signal is filtered to eliminate out-of-band radiation. Nevertheless, large clipping distortion may lead to severe BER performance degradation and inadequately filtering may lead to peak re-growth. On the other hand, probabilistic approach tries to reduce the probability of high PAPR level for the transmitted signal by changing the phase, order, level or other properties of the data stream. Probabilistic approach includes partial transmit sequence (PTS) method, selective mapping (SLM) method, tone reservation (TR) method, tone injection (TI) method, and pulse superposition method, among which the PTS method seems to be most attractive in terms of implementation complexity as well as PAPR reduction performance.

For a number of PAPR reduction methods such as the PTS, SLM and pulse superposition methods, the associated receiver needs to know about the modifications (e.g., the modified phases, orders or levels) that have been made to the data stream at the transmitter during PAPR reduction procedure. The modifications are referred to as the side information, which is used for correctly recovering the original data stream at the receiver. Correspondingly, the reliability of transmitting the side information related to PAPR reduction is extremely important for system's functionality.

FIG. 2 is the block diagram of an OFDM transmitter using the PTS method, which is disclosed in the U.S. Pat. No. 6,125,103. For reducing the PAPR of x(t), the input data block $X=[X[0], X[1], \ldots, X[N-1]]^T$ is first partitioned into L disjoint sub-blocks (or clusters), denoted by $X_1$, $X_2, \ldots, X_L$, of length N where the superscript 'T' represents vector transposition. Only N/L entries of $X_l$, $l \in \{1, 2, \ldots, L\}$, are taken from the corresponding entries of X and the remaining ones are set to zero. The partition scheme can be interleaved, adjacent, or irregular. The L disjoint sub-blocks are then phase-rotated and combined to form the following signal:

$$\tilde{X} = \sum_{l=1}^{L} b_l X_l \quad (4)$$

or, equivalently, $$\tilde{X}[k] = \sum_{l=1}^{L} b_l X_l[k], \quad k = 0, 1, \ldots, N-1 \quad (5)$$

where $b_l$ is the phase rotation factor (i.e., $|b_l|=1$) associated with the lth sub-block $X_l$.

Taking N-IFFT of (5) yields the transmitted signal $$\tilde{x}[n] = \sum_{l=1}^{L} b_l x_l[n], \quad n = 0, 1, \ldots, N-1 \quad (6)$$

where x[n], representing the N-IFFT of $X_l[k]$, is referred to as the PTS. The goal of the PTS method is to search for optimal phase sequence $\{b_1, b_2, \ldots, b_L\}$ such that the PAPR level of the resultant transmitted signal is minimum. In practice, the phase of $b_l$ is admitted to be one of a limited set of discrete values $\{2\pi m/M, m=0, 1, \ldots, M-1\}$, and $b_1$ can be fixed to unity without sacrificing any PAPR reduction performance. As such, finding optimal phase sequence $\{b_2, b_3, \ldots, b_L\}$ requires performing $M^{(L-1)}$ computations of (3), implying that optimal search for $\{b_2, b_3, \ldots, b_L\}$ is almost prohibitive for large L and M. For this reason, there have been low-complexity sub-optimal search algorithms, for which $\{b_2, b_3, \ldots, b_L\}$ is selected from a smaller subset of all possible candidates of $\{b_2, b_3, \ldots, b_L\}$. Obviously, sub-optimal search algorithms suffer from some degradation in PAPR reduction performance.

The phase sequence $\{b_2, b_3, \ldots, b_L\}$ is considered as the side information to be transmitted to the associated receiver, so that the receiver can correctly recover the data stream of sub-blocks $X_l$, l=2, 3, . . . , L. In conventional PTS method, the side information is transmitted via (L−1) reserved sub-carriers where one sub-carrier within each sub-block $X_l(l\epsilon\{2, 3, \ldots, L\})$ is allocated. The conventional method, however, provides no protection capability for the side information over these reserved sub-carriers and, thus, may result in unreliable side information detection at the receiver under noisy channel conditions. On the other hand, our invention provides a low-complexity and low-latency method and apparatus for reliably transmitting the side information regarding PAPR reduction in multicarrier communication systems.

SUMMARY OF THE INVENTION

The present invention has been made to overcome the above-mentioned drawback of conventional transmission of the side information related to PAPR reduction in multicarrier communication systems. An object of the present invention is to provide a low-complexity and low-latency method and apparatus, whereby the side information regarding PAPR reduction in the systems is reliably transmitted. In particular, the side information is encoded by an error-correction code and transmitted through a plurality of reserved sub-carriers. Modulation of the coded side information over the reserved sub-carriers is performed separately without re-performing data modulation. This invention thereby provides the advantages of dramatically reduced implementation complexity. Moreover, the proposed method is applicable to multicarrier communication systems with any number of sub-carriers and any type of data constellation, while introducing only slight or no degradation in PAPR reduction performance.

According to the invention, determination of the related parameters for PAPR reduction can be based on the PAPR of data modulated signal with slight degradation in PAPR reduction performance. Alternatively, it can also be based on the PAPR of transmitted signal with no loss of PAPR reduction performance.

The foregoing and other objects, features, aspects and advantages of the present invention will become better understood from a careful reading of the detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
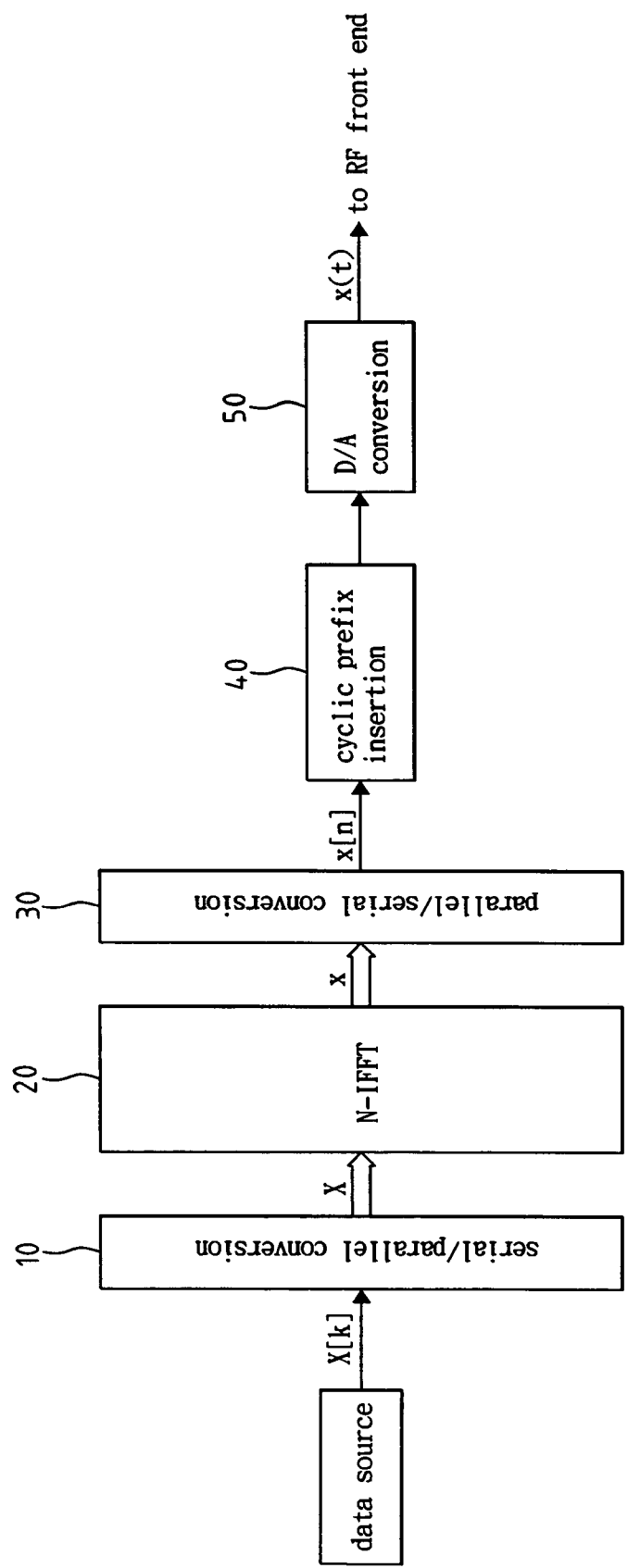
FIG. 1 is a simplified block diagram illustrating a typical OFDM transmitter.
Figure 2:
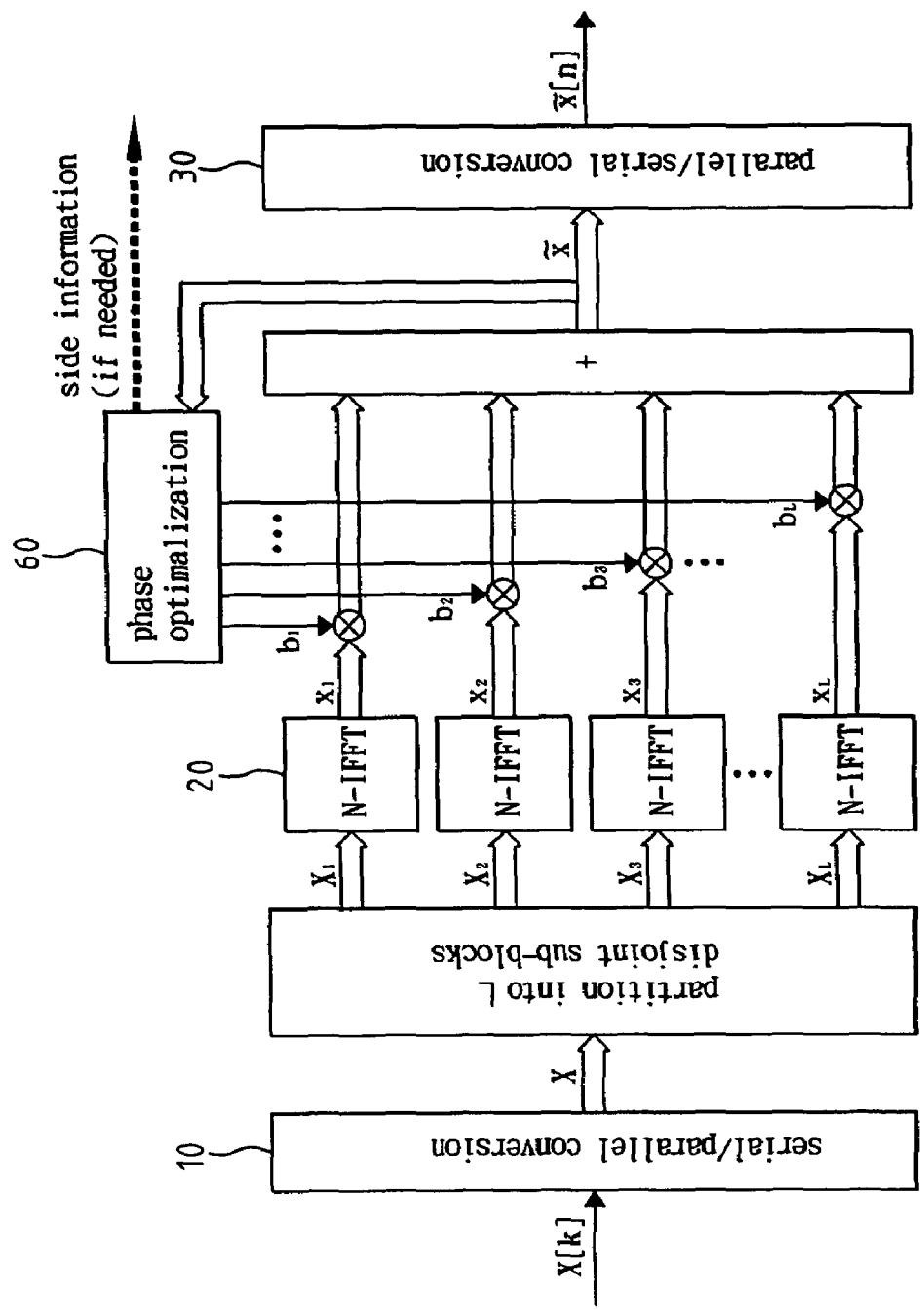
FIG. 2 is the block diagram of a conventional OFDM transmitter using the PTS method.
Figure 3:
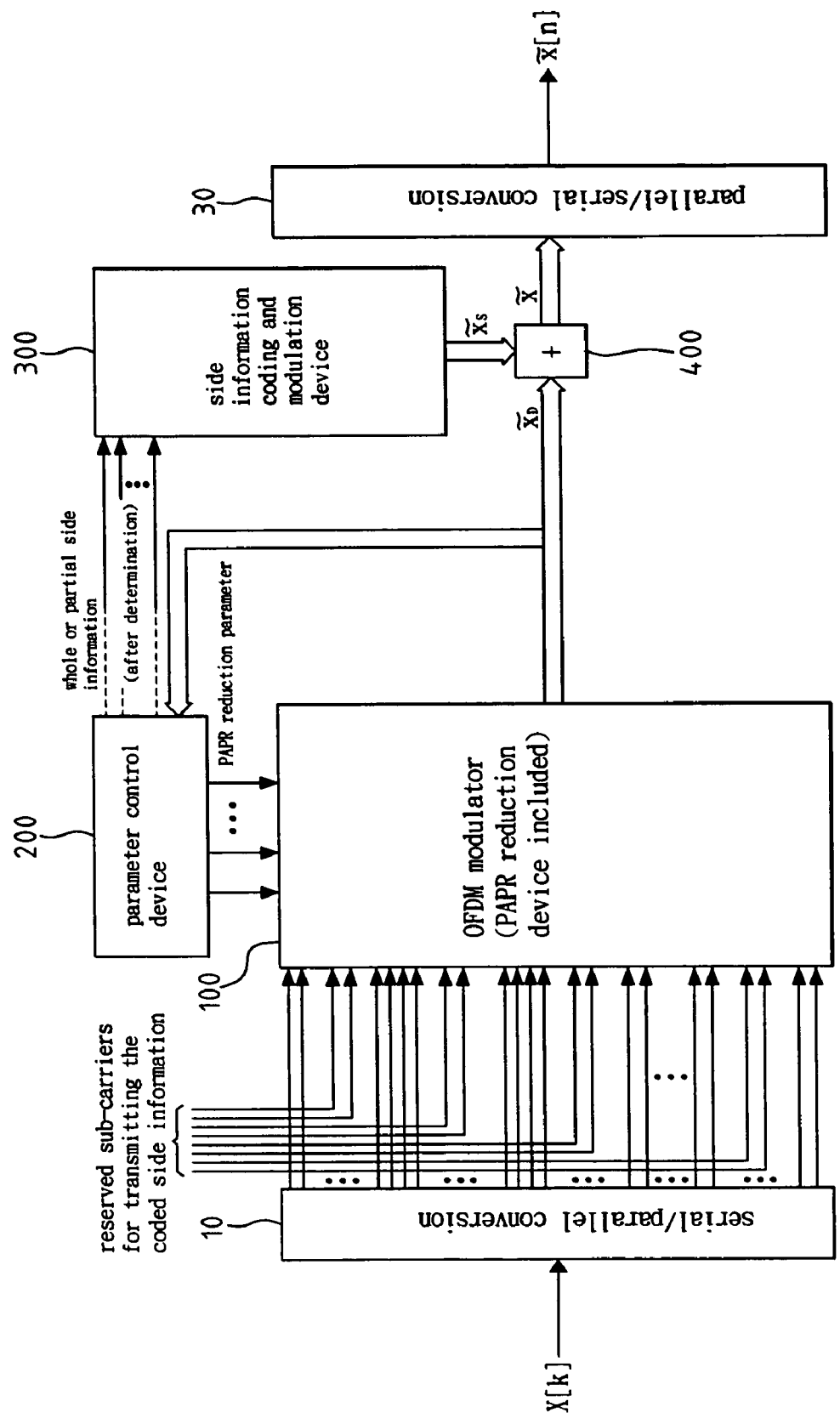
FIG. 3 is the block diagram of an OFDM transmitter illustrating the first embodiment of the present invention.

FIG. 3 is the block diagram of an OFDM transmitter in accordance with the first embodiment of the present invention. Referring to FIG. 3, the data X[k], k=0, 1, . . . , N−1, to be transmitted within an OFDM symbol period, are transformed via a S/P converter 10 into the input data block X. The OFDM modulator 100 having a parameter control device 200 for PAPR reduction performs OFDM modulation of the input data X and generates the data modulated signal $\tilde{x}_D$. The parameter control device 200 sequentially selects a set of parameters from all possible sets of parameters for PAPR reduction, and sends each set of selected PAPR reduction parameters to the OFDM modulator 100. The OFDM modulator 100 further modulates the input data X in accordance with the PAPR reduction parameters and derives the corresponding data modulated signal $\tilde{x}_D$. The procedure of selecting a new set of PAPR reduction parameters and deriving the corresponding data modulated signal $\tilde{x}_D$ is repeated until an acceptable PAPR level of $\tilde{x}_D$ is achieved. Alternately, it is repeated until all possible sets of PAPR reduction parameters have been selected and all the PAPR levels of the corresponding $\tilde{x}_D$ have been computed. Then, a set of optimal (or sub-optimal) PAPR reduction parameters is determined according to the computed PAPR levels of $\tilde{x}_D$.

After the set of optimal (or sub-optimal) PAPR reduction parameters has been determined, the side information coding and modulation device 300 performs encoding and OFDM modulation for the related information of the optimal (or sub-optimal) PAPR reduction parameters, referred to as the side information, and derives the side information modulated signal $\tilde{x}_S$. The side information modulated signal $\tilde{x}_S$ and the data modulated signal $\tilde{x}_D$ are further combined via an adder 400 to yield the transmitted signal $\tilde{x}$, which is then transformed into the transmitted sequence $\tilde{x}[n]$ via a P/S converter 30. Note that adding the side information modulated signal $\tilde{x}_S$ to the data modulated signal $\tilde{x}_D$ may lead to the resultant transmitted signal $\tilde{x}$ with a slightly higher PAPR level than that of $\tilde{x}_D$. Because the PAPR reduction parameters are determined based on the data modulated signal $\tilde{x}_D$, a slight degradation in PAPR reduction performance could be introduced.

In the first embodiment of FIG. 3, several sub-carriers are reserved for transmitting the side information, while the rest of sub-carriers are used for data transmission. The side information according to the embodiment of the invention can thus be properly protected. Moreover, modulation of the coded side information over the reserved sub-carriers and modulation of the data over the rest of sub-carriers are performed separately, thereby providing the benefit of dramatically reduced implementation complexity.

Figure 4:
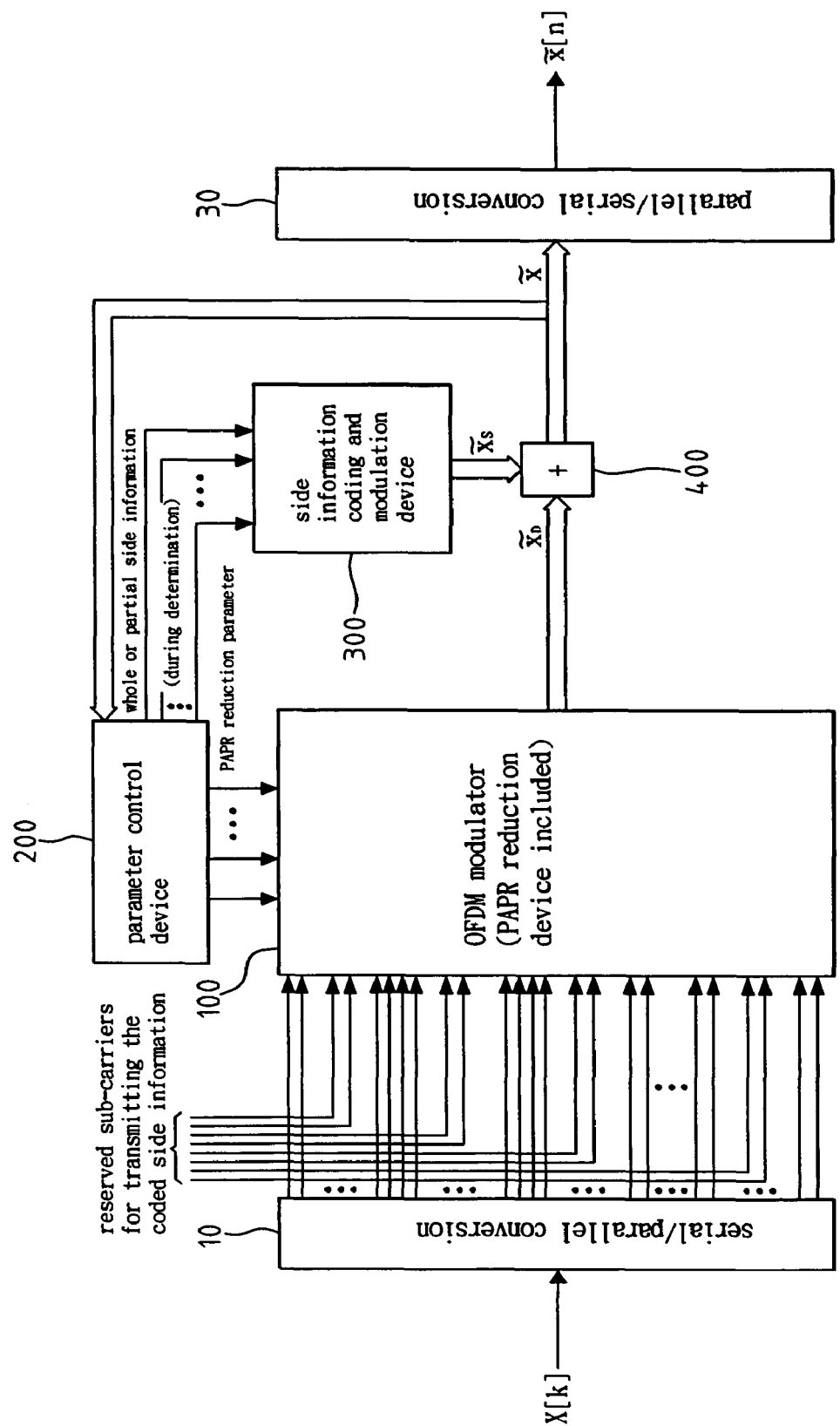
FIG. 4 is the block diagram of an OFDM transmitter illustrating another embodiment of the present invention.

FIG. 4 is the block diagram of an OFDM transmitter in accordance with another embodiment of the present invention. The data X[k], k=0, 1, . . . , N−1, to be transmitted within an OFDM symbol period, are transformed via a S/P converter 10 into the input data block X. The OFDM modulator 100 having a parameter control device 200 for PAPR reduction performs OFDM modulation of the input data X and generates the data modulated signal $\tilde{x}_D$. Similar to the embodiment of FIG. 3, several sub-carriers are reserved for transmitting the side information. In the embodiment of FIG. 4, how to yield the transmitted sequence $\tilde{x}[n]$ will become better understood from the detailed description provided herein below with reference to FIG. 4.

Referring to FIG. 4, during the procedure of determining optimal (or sub-optimal) PAPR reduction parameters, the parameter control device 200 sends each set of selected PAPR reduction parameters to the OFDM modulator 100. The OFDM modulator 100 modulates the input data X in accordance with these PAPR reduction parameters and derives the corresponding data modulated signal $\tilde{x}_D$. At the same time, the side information coding and modulation device 300 performs encoding and OFDM modulation for the related information of the selected PAPR reduction parameters, referred to as the side information, and derives the side information modulated signal $\tilde{x}_S$. The side information modulated signal $\tilde{x}_S$ and the data modulated signal $\tilde{x}_D$ are further combined via an adder 400 to yield the transmitted signal $\tilde{x}$. The procedure of selecting a new set of PAPR reduction parameters and deriving the corresponding transmitted signal $\tilde{x}$ is repeated until an acceptable PAPR level of $\tilde{x}$ is achieved. Alternatively, it is repeated until all possible sets of PAPR reduction parameters have been selected and all the PAPR levels of the corresponding $\tilde{x}$ have been computed. Then, a set of optimal (or sub-optimal) PAPR reduction parameters is determined according to the computed PAPR levels of $\tilde{x}$. After the PAPR reduction procedure has been completed, the finally resultant transmitted signal $\tilde{x}$ is transformed into the transmitted sequence $\tilde{x}[n]$ via a P/S converter 30.

The thereby obtained optimal (or sub-optimal) PAPR reduction parameters always reflect the PAPR level of the finally resultant transmitted sequence $\tilde{x}[n]$. Thus, the embodiment of FIG. 4 can protect the side information without any degradation of PAPR reduction performance, while introducing only slightly increased computation complexity.

In the following, for clear and simple presentation, the present invention is further illuminated in terms of only the PTS method, although it can also be applied to other types of PAPR reduction methods.

Figure 5:
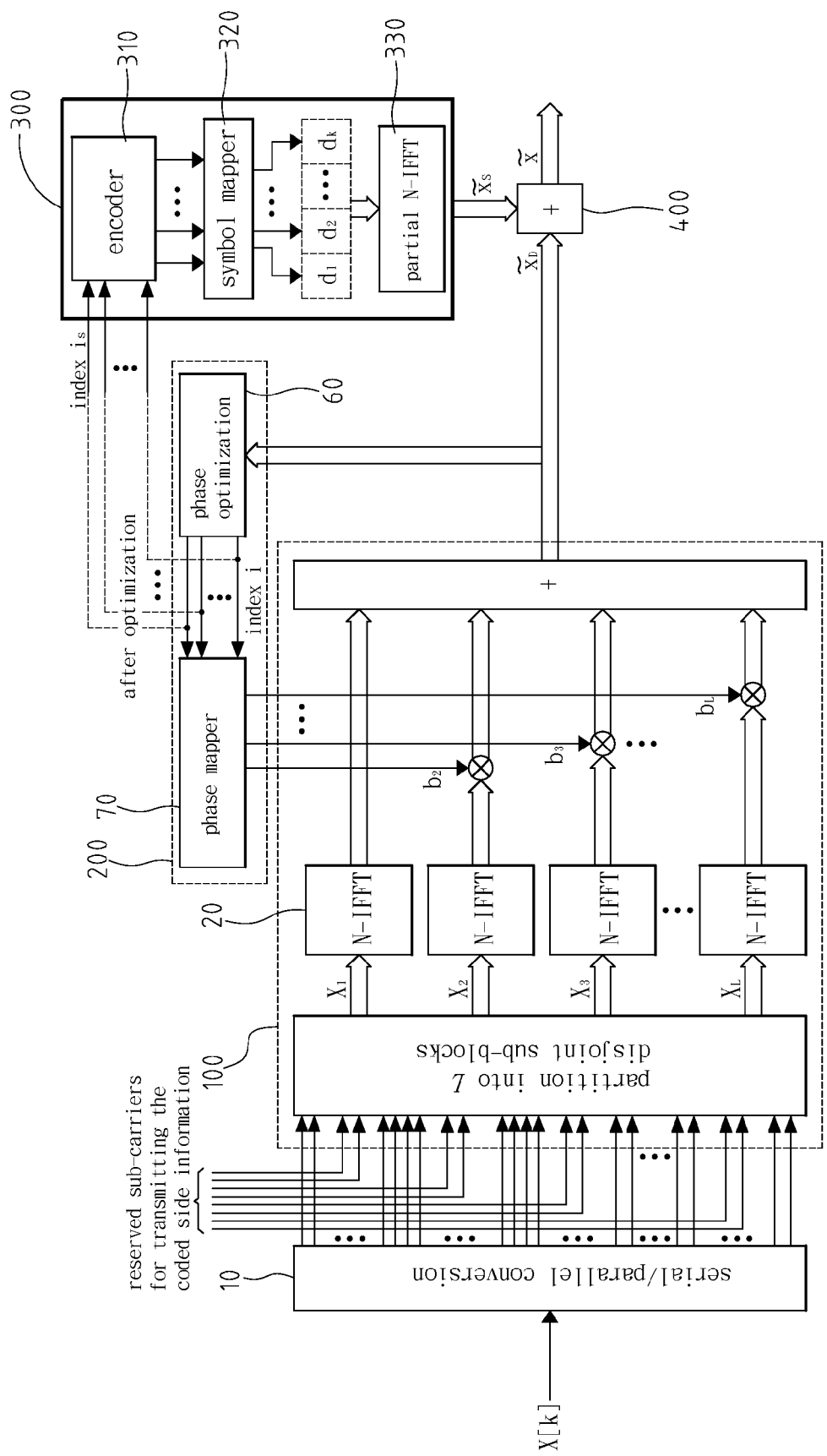
FIG. 5 is a more detailed block diagram illustrating the OFDM modulator, the parameter control device for PAPR reduction, and the side information coding and modulation device shown in FIG. 3, in which the PTS method is used and K reserved sub-carriers are used for protecting and transmitting the side information.

FIG. 5 is a more detailed block diagram illustrating the OFDM modulator 100, the parameter control device 200 for PAPR reduction, and the side information coding and modulation device 300 shown in FIG. 3. In FIG. 5, the parameter control device 200 determines an optimal (or sub-optimal) phase sequence $\{b_2, b_3, \ldots, b_L\}$ according to the PAPR level of the data modulated signal $\tilde{x}_D$ from the OFDM modulator 100. As mentioned before, when the PTS method searches for optimal (or sub-optimal) phase sequence $\{b_1, b_2, \ldots, b_L\}$, the phase of $b_1$ is admitted to be one of a limited set of discrete values $\{2\pi m/M, m=0, 1, \ldots, M−1\}$, and $b_1$ can be fixed to unity without sacrificing any PAPR reduction performance.

In the following, how to protect and transmit the side information about the phase sequence $\{b_2, b_3, \ldots, b_L\}$ via K reserved sub-carriers is further described.

In order to easily encode the phase sequence $\{b_2, b_3, \ldots, b_L\}$, the present invention first establishes a one-by-one mapping between each of the possibly used $\{b_2, b_3, \ldots, b_L\}$ and a corresponding index i, where $i \in \{0, 1, \ldots, I-1\}$ and I denotes the number of the possible candidates of $\{b_2, b_3, \ldots, b_L\}$. Note that $I=M^{(L-1)}$ for optimal search algorithms and may be less than $M^{(L-1)}$ for suboptimal search algorithms. Table 1 shows an example of such mapping with L=4 (four sub-blocks) and M=2 ($b_l \in \{\pm 1\}$) for optimal search algorithms ($I=2^3=8$).

TABLE 1

An exemplary mapping table for optimal search algorithms
(L = 4, M = 2 and I = 8)

| i | Index Binary representation | $b_2$ | $b_3$ | $b_4$ |
|---|---|---|---|---|
| 0 | 000 | 1 | 1 | 1 |
| 1 | 001 | 1 | 1 | −1 |
| 2 | 010 | 1 | −1 | 1 |
| 3 | 011 | 1 | −1 | −1 |
| 4 | 100 | −1 | 1 | 1 |
| 5 | 101 | −1 | 1 | −1 |
| 6 | 110 | −1 | −1 | 1 |
| 7 | 111 | −1 | −1 | −1 |

In FIG. 5, the parameter control device 200 for PAPR reduction further comprises a phase optimization unit 60 and a phase mapper 70. The phase optimization unit 60 sequentially selects an index i from the set of $\{1, 2, \ldots, I\}$ and the phase mapper 70 generates the associated phase sequence $\{b_2, b_3, \ldots, b_L\}$ according to the mapping as illustrated in Table 1, so that the OFDM modulator 100 can derive a new data modulated signal $\tilde{x}_D$. Such step is repeated until an optimal (or sub-optimal) phase sequence $\{b_2, b_3, \ldots, b_L\}$ is found.

Let is denote the index i corresponding to the determined $\{b_2, b_3, \ldots, b_L\}$ after phase optimization, then knowing the index $i_S$ is equivalent to knowing the determined sequence $\{b_2, b_3, \ldots, b_L\}$. Thus, the side information about $\{b_2, b_3, \ldots, b_L\}$ can be simply protected by error-correction encoding of the index $i_S$.

Further referring to FIG. 5, after the phase optimization unit 60 has determined the optimal (or sub-optimal) index $i_S$, the index $i_S$ is fed to the side information coding and modulation device 300 to generate the side information modulated signal $\tilde{x}_S$. The side information coding and modulation device 300 uses an error-correction code to protect the side information (the index $i_S$), and performs OFDM modulation of the coded side information. Specifically, the side information coding and modulation device 300 comprises an encoder 310 to proceed error-correction encoding of the index $i_S$, and the resultant codeword is mapped into a sequence $\{d_1, d_2, \ldots, d_K\}$ of K symbols via a symbol mapper 320. The sequence $\{d_1, d_2, \ldots, d_K\}$ is then modulated onto K reserved sub-carriers $\{p_1, p_2, \ldots, p_K\}$ by means of N-IFFT.

In general, the number of reserved sub-carriers is very few in the embodiment of FIG. 5. This allows the embodiment of FIG. 5 to simplify the required operations for N-IFFT as a partial N-IFFT 330 with different degree of complexity according to different arrangement of the reserved sub-carriers $\{p_1, p_2, \ldots, p_K\}$. The simplified process will be described later.

Figure 6:
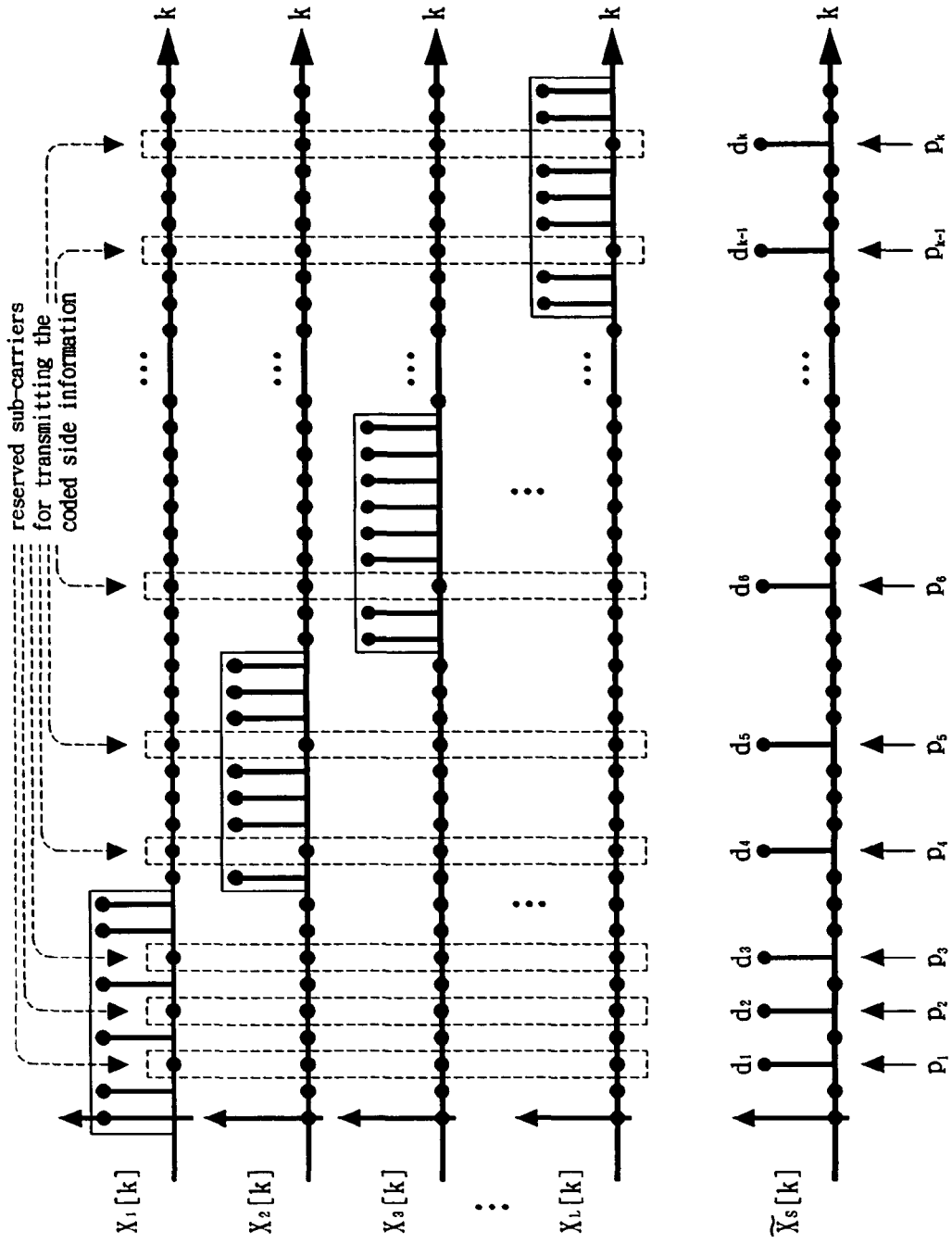
FIG. 6 illustrates the allocation of the K reserved sub-carriers for the OFDM transmitter shown in FIG. 5.

FIG. 6 illustrates the allocation of the K reserved sub-carriers for the OFDM transmitter in FIG. 5, in which the reserved sub-carriers are used for transmitting the coded side information. The data modulated signal $\tilde{x}_D$ and the side information modulated signal $\tilde{x}_S$ are corresponding to the N-IFFTs of the following signals, respectively:

$$\tilde{X}_D[k] = \sum_{l=1}^{L} b_l X_l[k], \quad k = 0, 1, \ldots, N-1, \quad (7)$$

and $$\tilde{X}_S[k] = \begin{cases} d_m, & \text{for } k = p_m, m = 1, 2, \ldots, K \\ 0, & \text{otherwise} \end{cases} \quad (8)$$

where $$X_l[k] = 0, \text{ for } k = p_m, m = 1, 2, \ldots, K \quad (9)$$

are reserved for transmitting the coded side information. The adder 400 in FIG. 5 sums up $\tilde{x}_D$ and $\tilde{x}_S$, and generates the transmitted sequence $$\tilde{x}[n] = \tilde{x}_D[n] + \tilde{x}_S[n], n=0, 1, \ldots, N-1. \quad (10)$$

Further referring to both FIG. 5 and FIG. 6 and according to (7) to (9), taking N-IFFT of (10) yields $$\tilde{X}[k] = \tilde{X}_D[k] + \tilde{X}_S[k] = \begin{cases} d_m, & \text{if } k = p_m, m = 1, 2, \ldots, K \\ \tilde{X}_D[k], & \text{otherwise} \end{cases} \quad (11)$$

Figure 7:
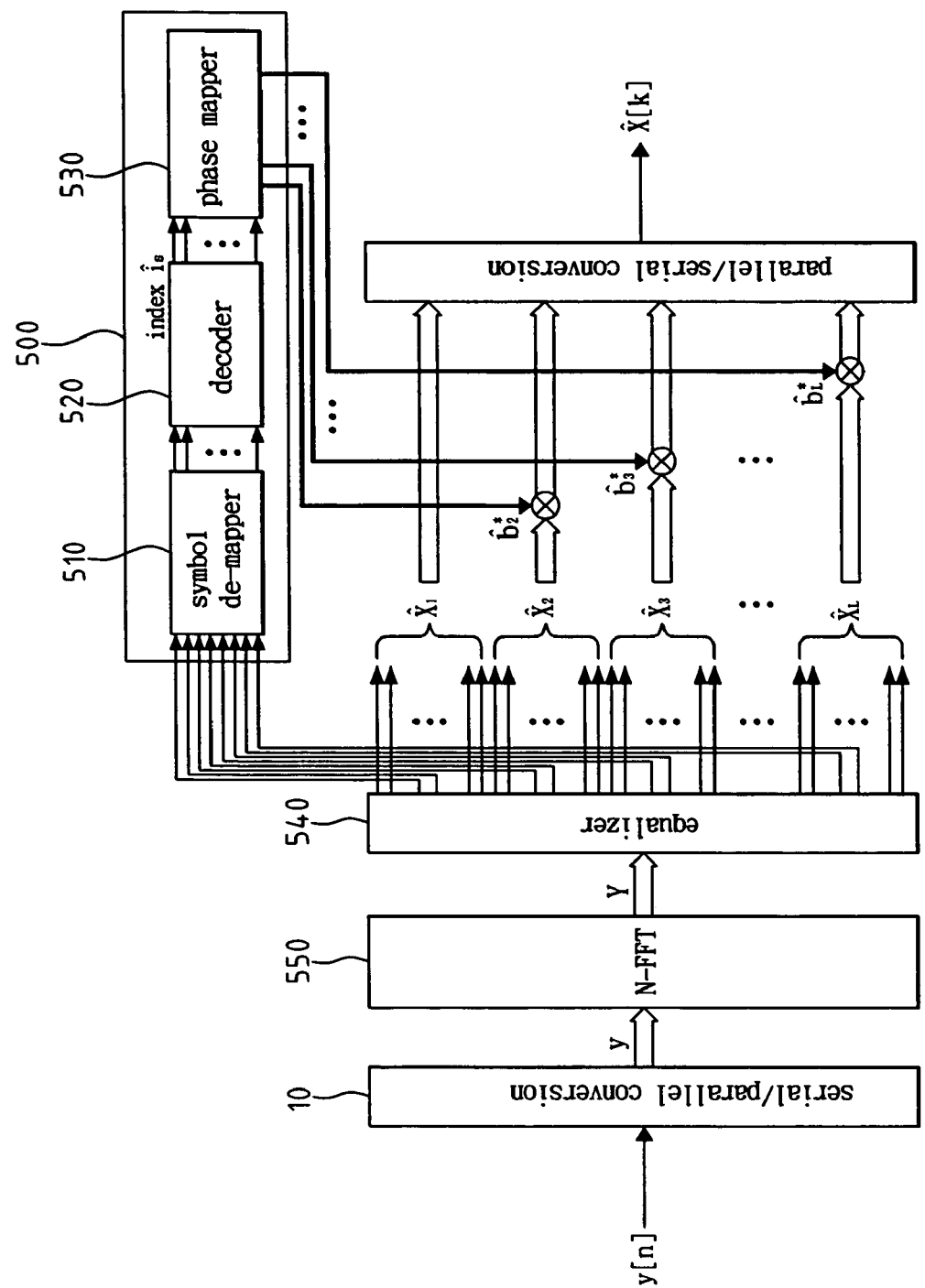
FIG. 7 is the block diagram of an OFDM receiver for detecting and decoding the transmitted side information as well as for recovering the original data stream.

Accordingly, an OFDM receiver for recovering both the side information and the original data is illustrated in FIG. 7. Referring to FIG. 7, the OFDM receiver receives the sequence y[n], which is transformed into the data block y via a S/P converter 10. After the received data y have been proceeded through an N-point fast Fourier transform (N-FFT) 550 and an equalizer 540, K symbols on the reserved sub-carriers $\{p_1, p_2, \ldots, p_K\}$ are picked out. Then, from the K symbols, the side information demodulation and decoding device 500 finds out the phase sequence $\{\hat{b}^*_2, \hat{b}^*_3, \ldots, \hat{b}^*_L\}$ that has been determined at the transmitter. According to the obtained phase sequence $\{\hat{b}^*_2, \hat{b}^*_3, \ldots, \hat{b}^*_L\}$, the OFDM receiver removes the phase rotations made at the transmitter and recovers the data sequence $\hat{X}[k]$.

As can be seen from FIG. 7, the side information demodulation and decoding device 500 further comprises a symbol de-mapper 510, a decoder 520 and a phase mapper 530 for finding out the phase sequence determined at the transmitter. The symbol de-mapper 510 de-maps the K symbols on the sub-carriers $\{p_1, p_2, \ldots, p_K\}$ into a corresponding codeword, and the decoder 520 decodes this codeword into a corresponding index $\hat{i}_S$. The phase mapper 530 then transforms the index $\hat{i}_S$ into a corresponding phase sequence $\{\hat{b}^*_2, \hat{b}^*_3, \ldots, \hat{b}^*_L\}$.

Further referring to FIG. 5, the complexity for deriving the side information modulated signal $\tilde{x}_S$ or, equivalently, for computing the N-IFFT of $\tilde{X}_S[k]$ can be dramatically reduced by virtue of the periodic property of the twiddle factor $W_N$ as well as the fact that the number of reserved sub-carriers is very few in general. This is explained by considering the following case. The input data block X is divided into four sub-blocks (L=4), and the coded side information is mapped into the sequence $\{d_1, d_2, d_3, d_4\}$ (K=4) which is to be transmitted through sub-carriers $\{p_1, p_2, p_3, p_4\}=\{p_1, p_1+N/4, p_1+2N/4, p_1+3N/4\}$.

Then, it can be easily shown that the side information modulated signal $$\tilde{x}_S[n] = \frac{1}{\sqrt{N}} \sum_{k=0}^{N-1} \tilde{X}_S[k] W_N^{kn} \quad (12)$$

$$= W_N^{np_1} \cdot \frac{1}{\sqrt{N}} \sum_{m=0}^{3} d_{m+1} W_4^{mn}, n = 0, 1, \ldots, N-1$$

Figure 8A:
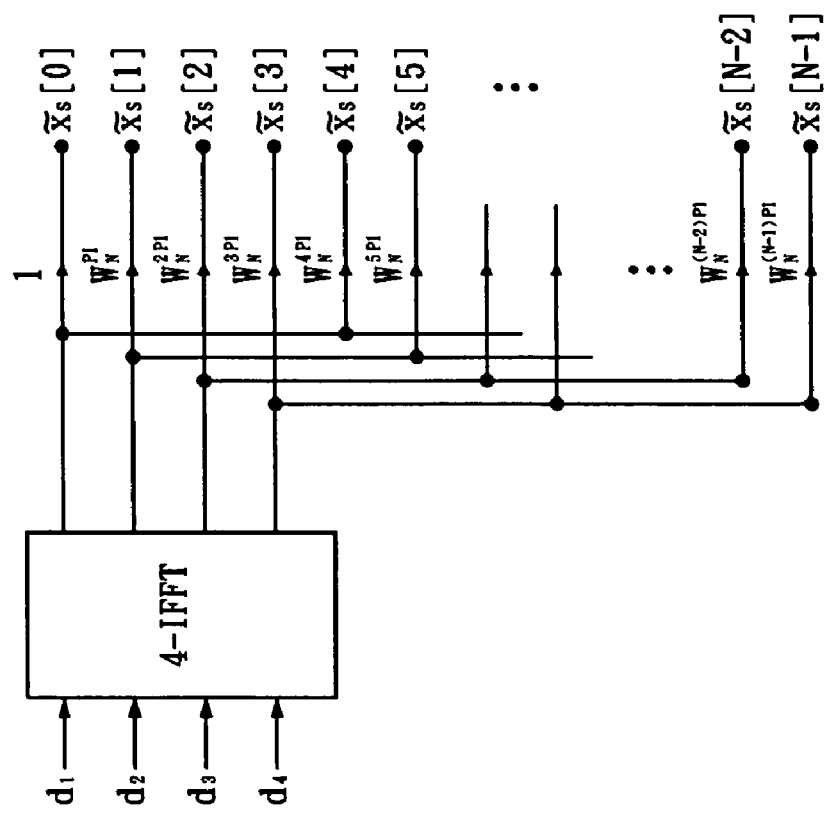
FIG. 8 are exemplary diagrams of computing the partial N-IFFT for (a) any given frequency $p_1$ and (b) a certain frequency $p_1$=N/8, and (c) an exemplary diagram of constructing the look-up mapping table in a memory device to generate a period of the side information modulated signal $\tilde{x}_S[n]$ for $p_1$=N/8.
Figure 8B:
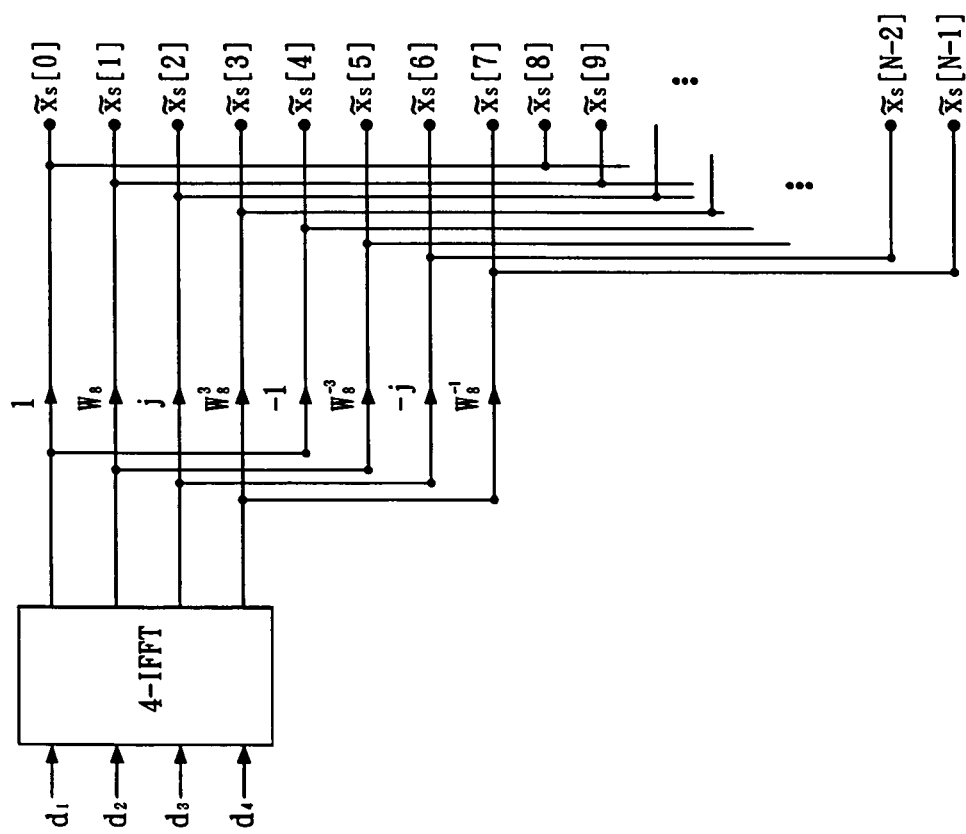
Figure 8C:
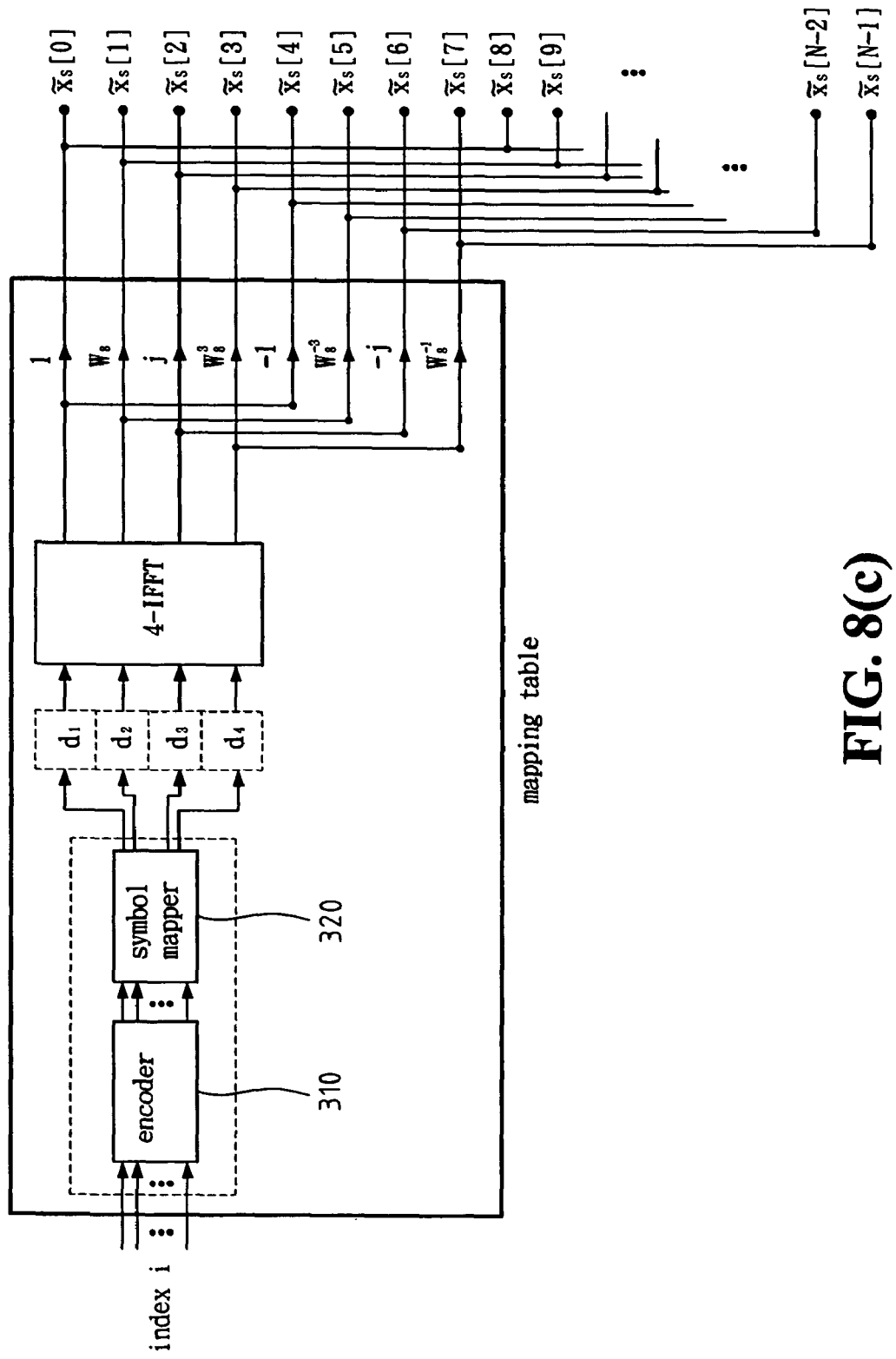

This reveals that the N-IFFT of $\tilde{X}_S[k]$ can be simply implemented by a 4-IFFT followed by (N−1) complex multipliers (associated with $W_N^{np_2}$), as shown in FIG. 8(*a*).

When $p_1=N/8$, the implementation in FIG. 8(*a*) reduces to the one in FIG. 8(*b*) where only a 4-IFFT and four complex multipliers are needed. Furthermore, only a 4-IFFT is needed for $p_1=0$. Note that the original N-IFFT requires $N\log_2 N$ complex additions and $(N/2)\log_2 N$ complex multiplication operations, whereas the simplified implementation, referred to as the partial N-IFFT 330 for clarity, requires only eight complex additions and (N+3) complex multiplication operations for any given frequency $p_1$. On the other hand, generation of the side information modulated signal $\tilde{x}_S[n]$ depends only on the given index i implying that $\tilde{x}_S[n]$ can be generated by simply looking through a mapping table that has been constructed in advance for all $i \in \{0, 1, \ldots, I-1\}$ and can be stored in a memory device such as a read-only memory (ROM). Similarly, the size of the mapping table (the memory device) can be reduced dramatically by virtue of the above-mentioned fact and the periodic property of the twiddle factor, as exemplified in FIG. 8(*c*) for $p_1=N/8$.

Note that in the embodiment of FIG. 5, determination of the index $i_S$ is based on the PAPR level of the data modulated signal $\tilde{x}_D$, implying that adding the side information modulated signal $\tilde{x}_S$ to the signal $\tilde{x}_D$ as given by (10) may lead to an increased PAPR level of the transmitted signal $\tilde{x}_S$. The resultant degradation of PAPR reduction performance, however, can be negligible if the total power of $\tilde{x}_S$ is much less than that of $\tilde{x}_D$.

Figure 9:
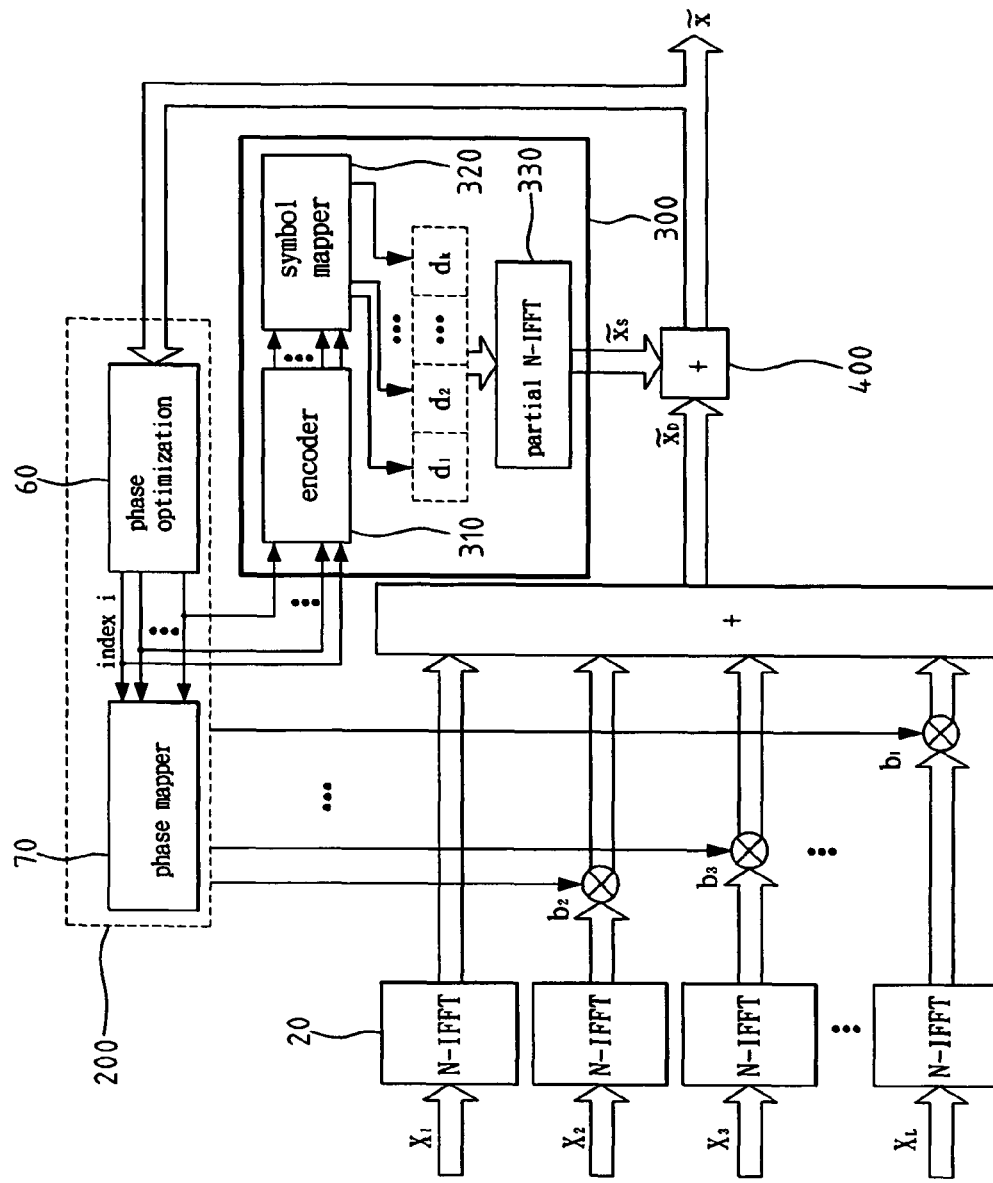
FIG. 9 is a more detailed block diagram illustrating the OFDM modulator, the parameter control device for PAPR reduction, and the side information coding and modulation device shown in FIG. 4, in which the PTS method is used and K reserved sub-carriers are used for protecting and transmitting the side information.

Alternatively, another embodiment as shown in FIG. 9 of the present invention determines the index is based on the PAPR level of the transmitted signal $\tilde{x}$ without any degradation of PAPR reduction performance. FIG. 9 is a more detailed block diagram of the OFDM transmitter shown in FIG. 4, in which the parameter control device 200 for PAPR reduction and the side information coding and modulation device 300 are further illustrated. The side information coding and modulation device 300 generates the side information modulated signal $\tilde{x}_S$ for every selected index $i \in \{0, 1, \ldots, I-1\}$ during phase optimization, and thus the embodiment of FIG. 9 requires more computations than that of FIG. 5.

Next, other embodiments of the present invention with further reduced complexity are provided. First, the invention divides the sequence $\{d_1, d_2, \ldots, d_K\}$ regarding the coded side information into two sequences, $\{d_1, d_2, \ldots, d_{\tilde{K}}\}$ and $\{\sqrt{P_b}b_2, \sqrt{P_b}b_3, \ldots, \sqrt{P_b}b_L\}$, where $\tilde{K}+(L-1)=K$ and $P_b$ is the average power for transmitting the latter sequence. The former sequence $\{d_1, d_2, \ldots, d_{\tilde{K}}\}$ is to be modulated onto $\tilde{K}$ reserved sub-carriers $\{p_1, p_2, \ldots, p_{\tilde{K}}\}$ for transmitting part of the coded side information, while the latter sequence $\{\sqrt{P_b}b_2, \sqrt{P_b}b_3, \ldots, \sqrt{P_b}b_L\}$ is to be imposed onto (L−1) reserved sub-carriers $\{q_2, q_3, \ldots, q_L\}$ for transmitting the remaining part of the coded side information.

Figure 10:
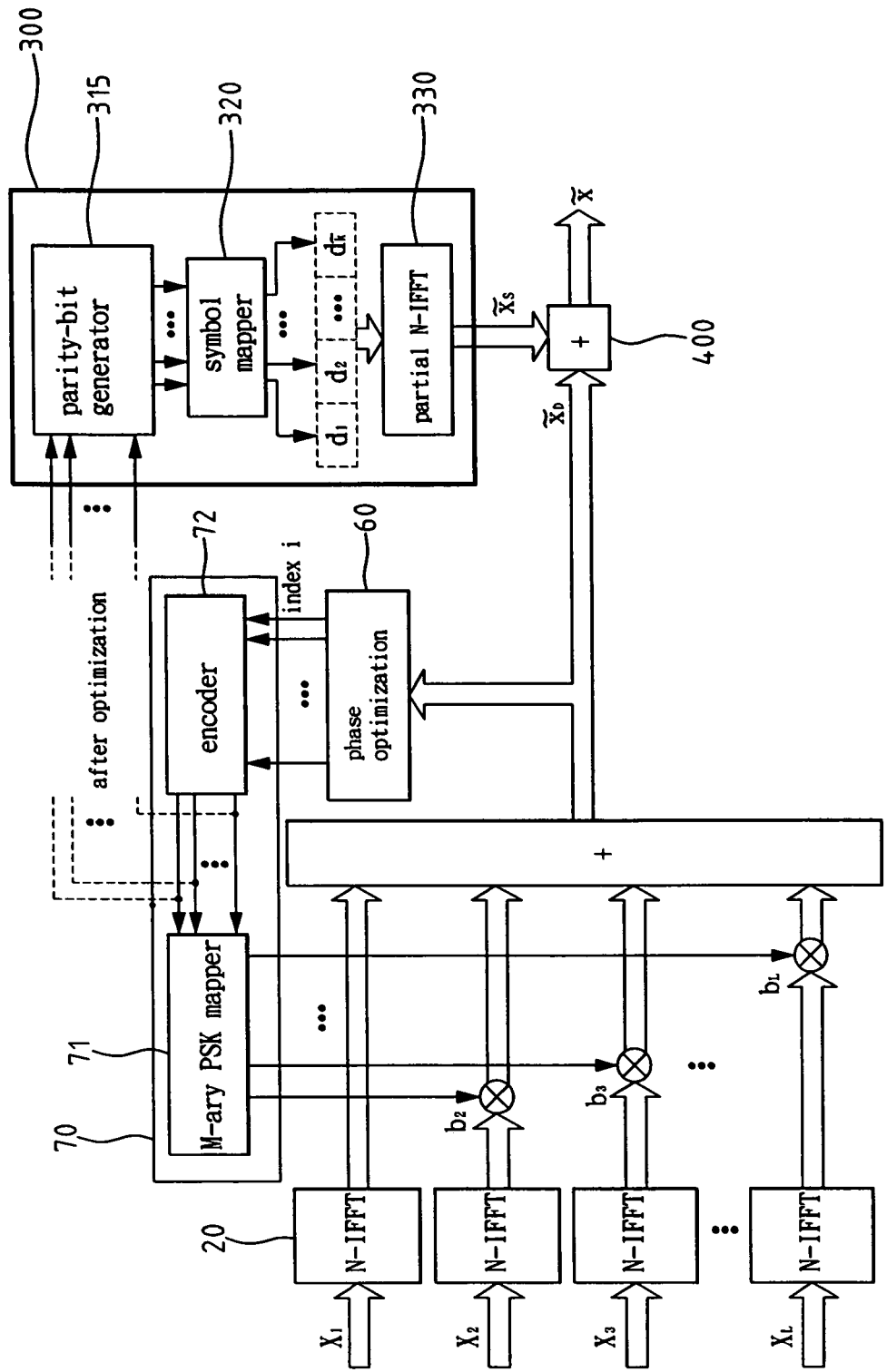
FIG. 10 is a more detailed block diagram illustrating the OFDM modulator, the parameter control device for PAPR reduction, and the side information coding and modulation device shown in FIG. 3, in which the PTS method is used and two groups of reserved sub-carriers are used for protecting and transmitting the side information.

FIG. 10 is a more detailed block diagram illustrating the OFDM transmitter shown in FIG. 3, in which the PTS method is used and the parameter control device 200 for PAPR reduction and the side information coding and modulation device 300 are further illustrated. Referring to FIG. 10, the parameter control device 200 for PAPR reduction comprises a phase optimization unit 60 and a phase mapper 70. The phase mapper 70 is implemented by an encoder 72 followed by an M-ary phase-shift keying (PSK) mapper 71. For optimal search algorithms, the encoder 72 is inexistent and the phase mapper 70 reduces to the M-ary PSK mapper 71, which is illustrated again as in Table 1 with binary bits $\{0, 1\}$ mapped into BPSK symbols $\{+1, -1\}$, respectively. The BPSK symbols from the M-ary PSK mapper 71 (M=2) are then used as the phase rotation factors $b_l$, $l=2, 3, \ldots, L$.

For sub-optimal algorithms, Table 2 shows another example of such phase mapping with L=4 (four sub-blocks) and M=4 ($b_l \in \{\pm 1, \pm j\}$), where only I (=8) candidates of $\{b_2, b_3, b_4\}$ out of total 64 (=$4^3$) candidates are used for selecting sub-optimal phase sequence $\{b_2, b_3, b_4\}$. The index i in Table 2 is encoded by the encoder 72 with a linear (6, 3) block code of generator matrix $$G = \begin{bmatrix} 0 & 1 & 1 & 1 & 0 & 0 \\ 1 & 0 & 1 & 0 & 1 & 0 \\ 1 & 1 & 0 & 0 & 0 & 1 \end{bmatrix} \quad (13)$$

and two-tuple binary bits $\{00, 01, 11, 10\}$ in the resultant codeword are mapped into quarternary phase shift keying (QPSK) symbols $\{1, j, -1, -j\}$, respectively. The QPSK symbols from the M-ary PSK mapper 71 (M=4) are then used as the phase rotation factors $b_l$, $l=2, 3, \ldots, L$.

TABLE 2

An exemplary mapping table for sub-optimal search algorithms (L = 4, M = 4 and I = 8)

| Index | | | | | | |
|---|---|---|---|---|---|---|
| i | Binary representation | codeword | | | $b_2$ | $b_3$ | $b_4$ |

| i | Binary representation | codeword | | | $b_2$ | $b_3$ | $b_4$ |
|---|---|---|---|---|---|---|---|
| 0 | 000 | 00 | 00 | 00 | 1 | 1 | 1 |
| 1 | 001 | 11 | 00 | 01 | −1 | 1 | j |
| 2 | 010 | 10 | 10 | 10 | −j | −j | −j |
| 3 | 011 | 01 | 10 | 11 | j | −j | −1 |
| 4 | 100 | 01 | 11 | 00 | j | −1 | 1 |
| 5 | 101 | 10 | 11 | 01 | −j | −1 | j |
| 6 | 110 | 11 | 01 | 10 | −1 | j | −j |
| 7 | 111 | 00 | 01 | 11 | 1 | j | −1 |

As shown in FIG. 10, two-stage encoding of the index $i_S$ is provided to protect the side information. During phase optimization, the first-stage encoding of each index i is performed by the encoder 72 and the resultant codeword is mapped to the sequence $\{b_2, b_3, \ldots, b_L\}$ by the M-ary PSK mapper 71. By allocating one sub-carrier per sub-block with the value of $\sqrt{P_b}$, the sequence $\{\sqrt{P_b}b_2, \sqrt{P_b}b_3, \ldots, \sqrt{P_b}b_L\}$ for index i can be imposed onto the (L−1) reserved sub-carriers $\{q_2, q_3, \ldots, q_L\}$, where sub-carrier $q_l$ is within the frequency range of the lth sub-block. After phase optimization, the codeword for the index is from the encoder 72 is fed to the side information coding and modulation device 300 for second-stage encoding and modulation. The side information coding and modulation device 300 comprises a parity-bit generator 315, a symbol mapper 320 for mapping the generated parity bits into the sequence $\{d_1, d_2, \ldots, d_{\tilde{K}}\}$, and a partial N-IFFT 330 for performing OFDM modulation of the sequence $\{d_1, d_2, \ldots, d_{\tilde{K}}\}$ according to the arrangement of sub-carriers $\{p_1, p_2, \ldots, p_{\tilde{K}}\}$.

Figure 11:
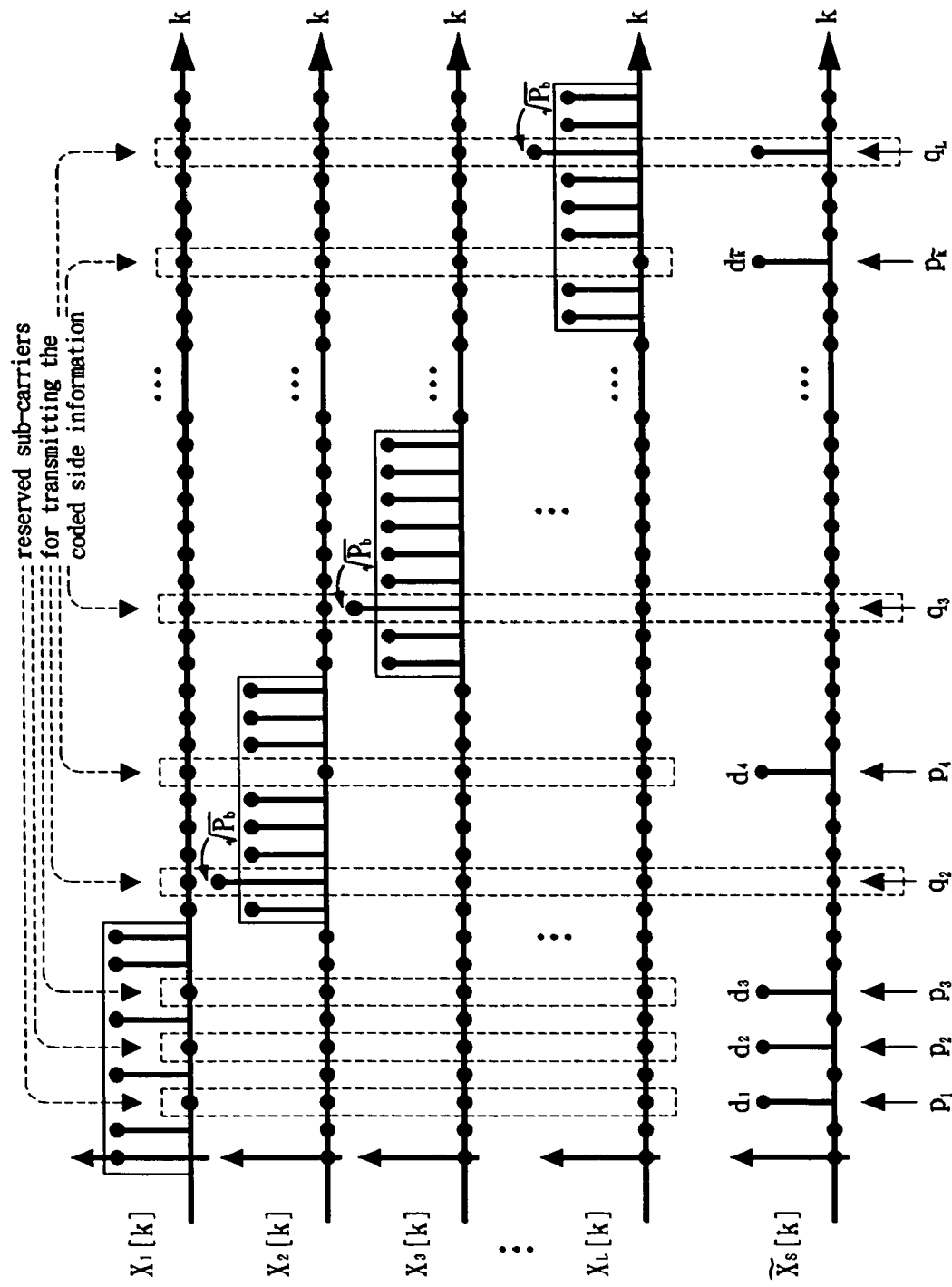
FIG. 11 illustrates the allocation of the two groups of reserved sub-carriers for the OFDM transmitter in FIG. 10.

FIG. 11 shows an example illustrating the allocation of the two groups of reserved sub-carriers $\{p_1, p_2, \ldots, p_{\tilde{K}}\}$ and $\{q_2, q_3, \ldots, q_L\}$ for two-stage protection of the side information. Let the N-FFT of the data modulated signal $\tilde{x}_D[n]$ be given as (7) with $$X_I[k] = \begin{cases} 0, & \text{for } k = p_m, m = 1, 2, \ldots, \tilde{K} \\ \sqrt{P_b}, & \text{for } k = q_l, l = 2, 3, \ldots, L \end{cases} \quad (14)$$

and the N-FFT of the side information modulated signal $\tilde{x}_S[n]$ be given as $$\tilde{X}_S[k] = \begin{cases} d_m, & \text{for } k = p_m, m = 1, 2, \ldots \tilde{K} \\ 0, & \text{otherwise} \end{cases} \quad (15)$$

It can be easily seen, from (7), (10), (14) and (15), that $$\tilde{X}[k] = \tilde{X}_D[k] + \tilde{X}_S[k] = \begin{cases} d_m, & \text{for } k = p_m, m = 1, 2, \ldots, \tilde{K} \\ \sqrt{P_b} \cdot b_l, & \text{for } k = q_l, l = 2, 3, \ldots, L \\ \tilde{X}_D[k], & \text{otherwise} \end{cases} \quad (16)$$

This reveals that with the allocation as in FIG. 11, the two sequences $\{d_1, d_2, \ldots, d_{\tilde{K}}\}$ and $\{\sqrt{P_b}b_2, \sqrt{P_b}b_3, \ldots, \sqrt{P_b}b_L\}$ representing the two-stage coded side information are put on two groups of reserved sub-carriers $\{p_1, p_2, \ldots, p_{\tilde{K}}\}$ and $\{q_2, q_3, \ldots, q_L\}$, respectively. Therefore, the resultant transmitted signal $\tilde{x}[n]$ contains both groups of symbols for transmission of the index $i_S$. The corresponding receiver is similar to that in FIG. 7.

Because of the fact that $\tilde{K}<K$, the embodiment of FIG. 10 has the benefits of lower complexity for computing the partial N-IFFT of $\tilde{X}_S[k]$ and less degradation in PAPR reduction performance than that of FIG. 5, where both embodiments determining the index $i_S$ are based on the PAPR level of the data modulated signal $\tilde{x}_D$.

Figure 12:
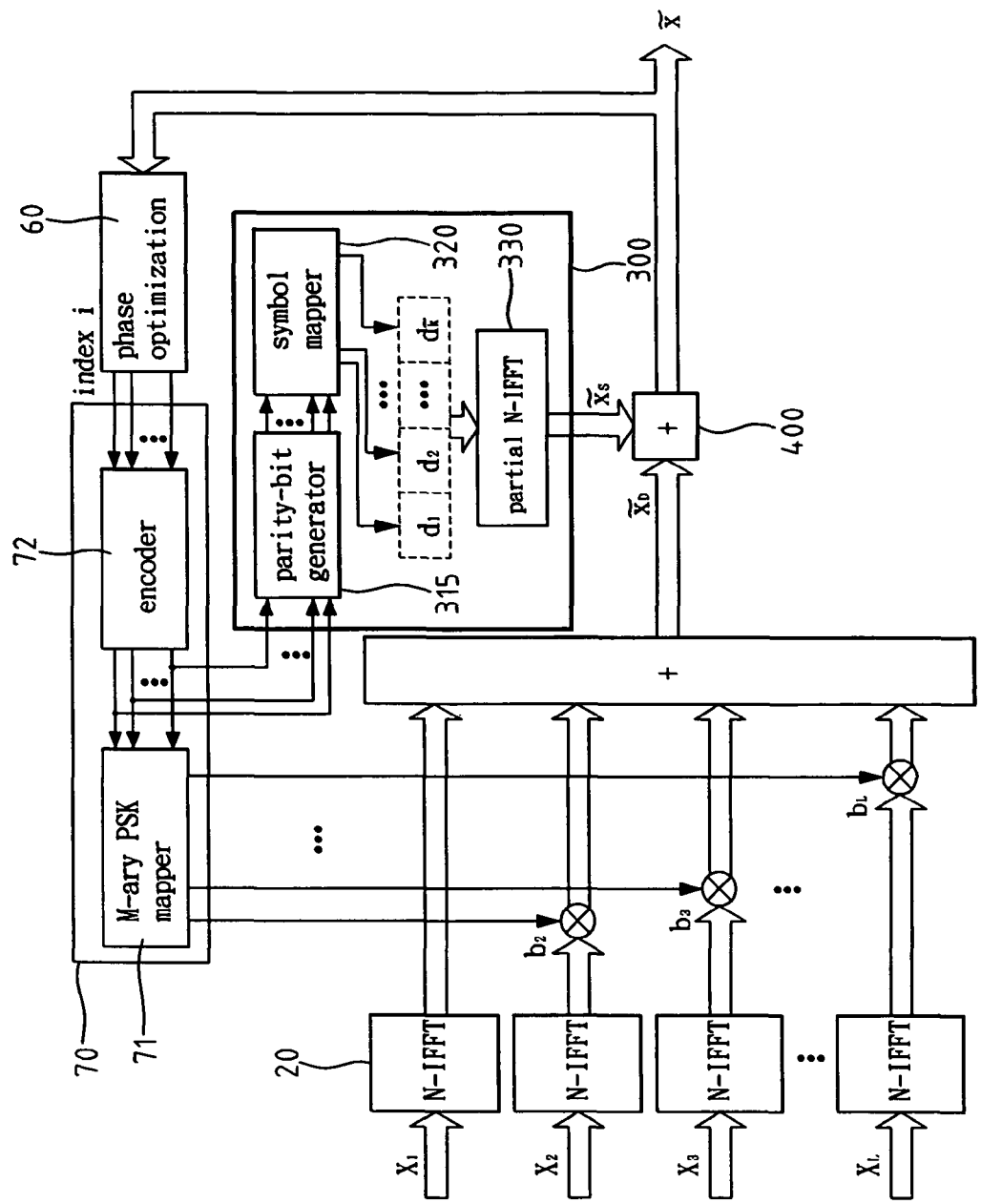
FIG. 12 is a more detailed block diagram illustrating the OFDM modulator, the parameter control device for PAPR reduction, and the side information coding and modulation device shown in FIG. 4, in which the PTS method is used and two groups of reserved sub-carriers are used for protecting and transmitting the side information.

Similarly, obtaining the index i during phase optimization can also be based on the PAPR level of the transmitted signal $\tilde{x}$ as illustrated by the embodiment of FIG. 12, thereby further reducing complexity in FIG. 9. FIG. 12 is a more detailed block diagram illustrating the OFDM transmitter shown in FIG. 4, in which the PTS method is used and the parameter control device 200 for PAPR reduction and the side information coding and modulation device 300 are further illustrated. The parameter control device 200 for PAPR reduction comprises a phase optimization unit 60 and a phase mapper 70. The phase mapper 70 is implemented by an encoder 72 followed by an M-ary PSK mapper 71. The PSK sequence $\{b_2, b_3, \ldots, b_L\}$ from the M-ary PSK mapper 71 are imposed onto (L−1) reserved sub-carriers $\{q_2, q_3, \ldots, q_L\}$. The side information coding and modulation device 300 comprises a parity-bit generator 315 for encoding the output from the encoder 72, and a symbol mapper 320 for mapping the parity bits from the parity-bit generator 315 into the sequence $\{d_1, d_2, \ldots, d_{\tilde{K}}\}$, and a partial N-IFFT 330 for performing OFDM modulation of the sequence $\{d_1, d_2, \ldots, d_{\tilde{K}}\}$ according to the arrangement of sub-carriers $\{p_1, p_2, \ldots, p_{\tilde{K}}\}$. This therefore transmits the two-stage coded side information through two groups of reserved sub-carriers $\{p_1, p_2, \ldots, p_{\tilde{K}}\}$ and $\{q_2, q_3, \ldots, q_L\}$. Similar to the embodiment of FIG. 10, transmission of the index $i_S$ is completed through the generation of the two sequences $\{d_1, d_2, \ldots, d_{\tilde{K}}\}$ and $\{b_2, b_3, \ldots, b_L\}$. The corresponding receiver is also similar to that in FIG. 7.

In the following, some simulation results regarding the embodiments of FIG. 10 and FIG. 12 for verifying the present invention are provided.

In the simulation, the data X[k]'s were assumed to be equally probable 16-QAM symbols with unit variance, and the optimal search PTS method with adjacent partition scheme was used for L=4 (four sub-blocks) and M=2 ($b_l \in \{\pm1\}$). For the embodiments of FIGS. 10 and 12, the encoder 72 was inexistent due to utilization of optimal search algorithm, and three information bits representing the index i were mapped into the BPSK sequence $\{b_2, b_3, b_4\}$ by the M-ary PSK mapper 71 with the phase mapping as in Table 1. The three information bits were encoded by the linear (6, 3) block code given by (13) where the resultant three parity bits as the outputs of the parity-bit generator 315 were mapped into the BPSK sequence $\{d_1, d_2, d_3\}$ (i.e., $\tilde{K}$=3) by the symbol mapper 320. The two sequences $\{d_1, d_2, d_3\}$ and $\{b_2, b_3, b_4\}$ ($\sqrt{P_b}$=1) were transmitted through two groups of reserved sub-carriers $\{p_1, p_2, p_3\}$={N/8, 3N/8, 5N/8} and $\{q_2, q_3, q_4\}$={2N/8, 4N/8, 6N/8}, respectively. The PAPR reduction performance was evaluated based on four times oversampling (R=4) of the resultant transmitted signal $\tilde{x}[n]$ (using (3)) and $10^5$ Monte Carlo Runs.

Figure 13A:
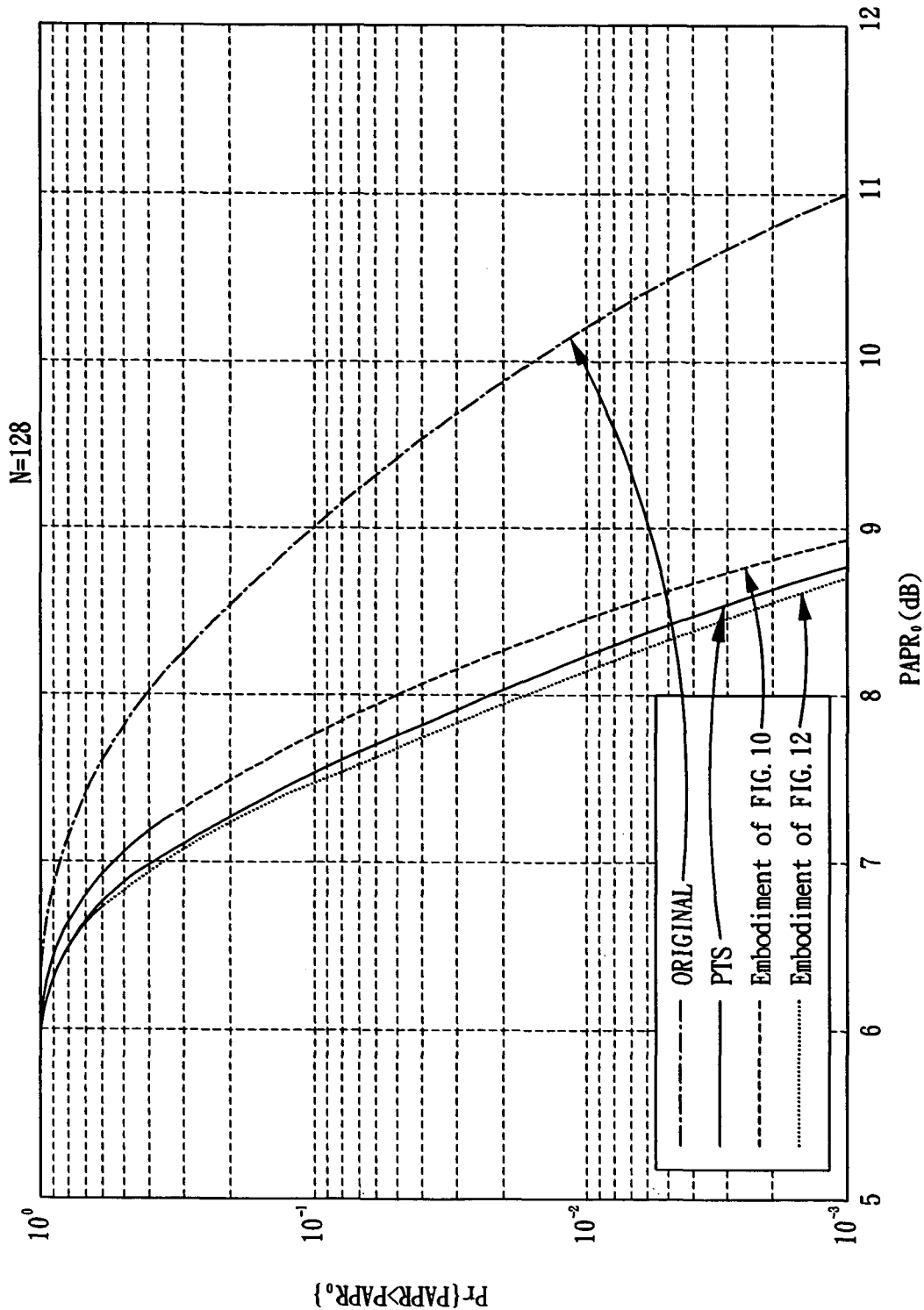
FIGS. 13(a) and 13(b) plot the complementary cumulative distribution function of the obtained $10^5$ independent realizations of PAPR levels for 128 and 1024 sub-carriers, respectively.
Figure 13B:
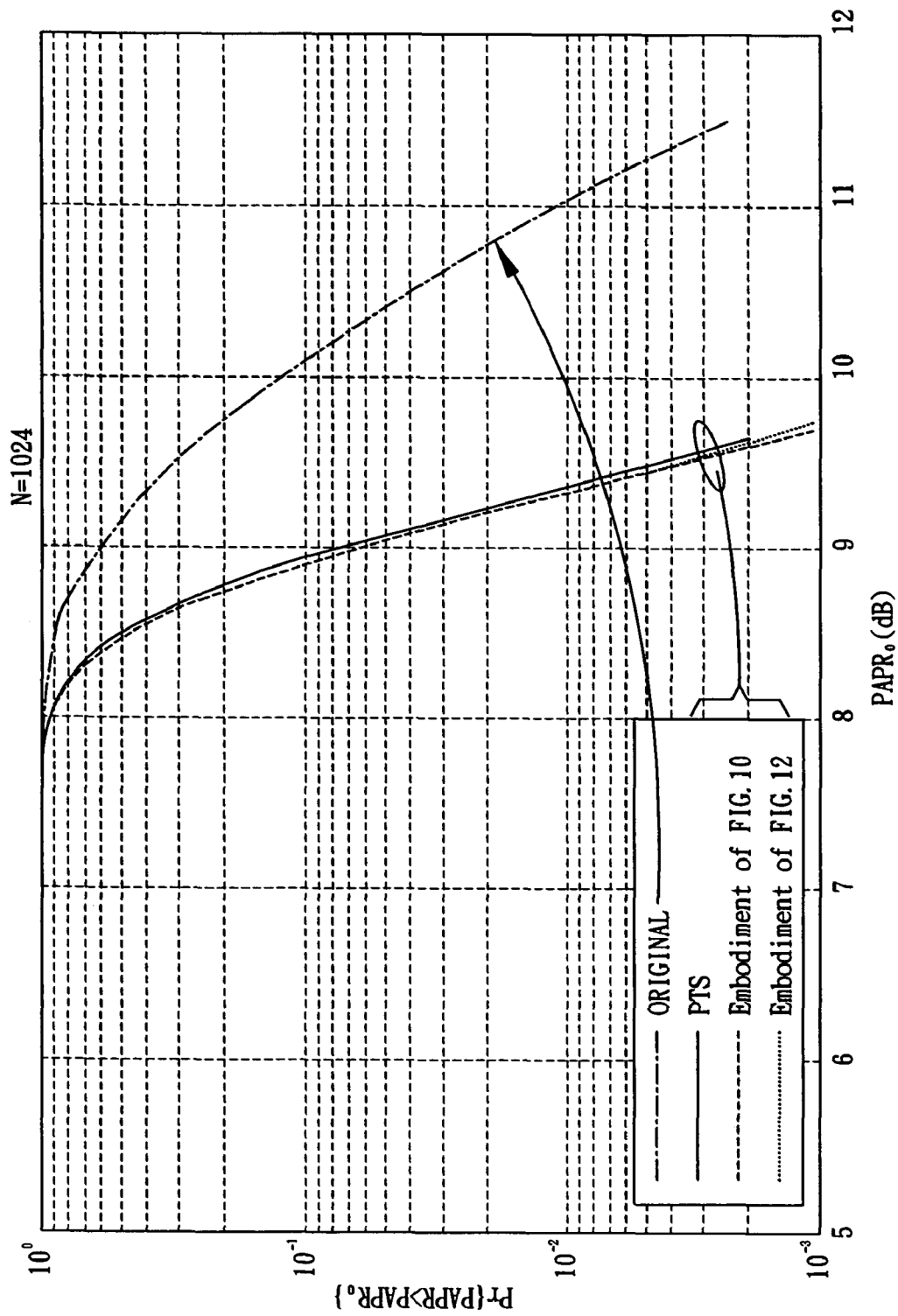

FIGS. 13(a) and 13(b) plot the complementary cumulative distribution function (CCDF), Pr{PAPR>PAPR$_0$}, of the obtained $10^5$ independent realizations of PAPR levels for 128 and 1024 sub-carriers, respectively. Note that the lines indicated by "ORIGINAL" in these figures are the results obtained without any PAPR reduction, and those indicated by "PTS" are the ones obtained using the optimal search PTS method with no sub-carriers reserving for side information transmission. From FIG. 13(a) (N=128), it can be observed that the embodiment of FIG. 10 exhibits a little bit performance degradation in PAPR reduction whereas that of FIG. 12 slightly improves the PAPR reduction performance. These performance disparities, however, are almost invisible in FIG. 13(b) for the case of N=1024.

On the other hand, the detection performance for $\{b_2, b_3, b_4\}$ was evaluated by passing the transmitted signal $\tilde{x}[n]$ (N=1024) through a frequency flat channel as well as a two-path frequency selective channel whose impulse response h[n]=δ[n]+0.5δ[n−5]. The received signal was assumed to be corrupted by additive white Gaussian noise (AWGN).

Figure 14A:
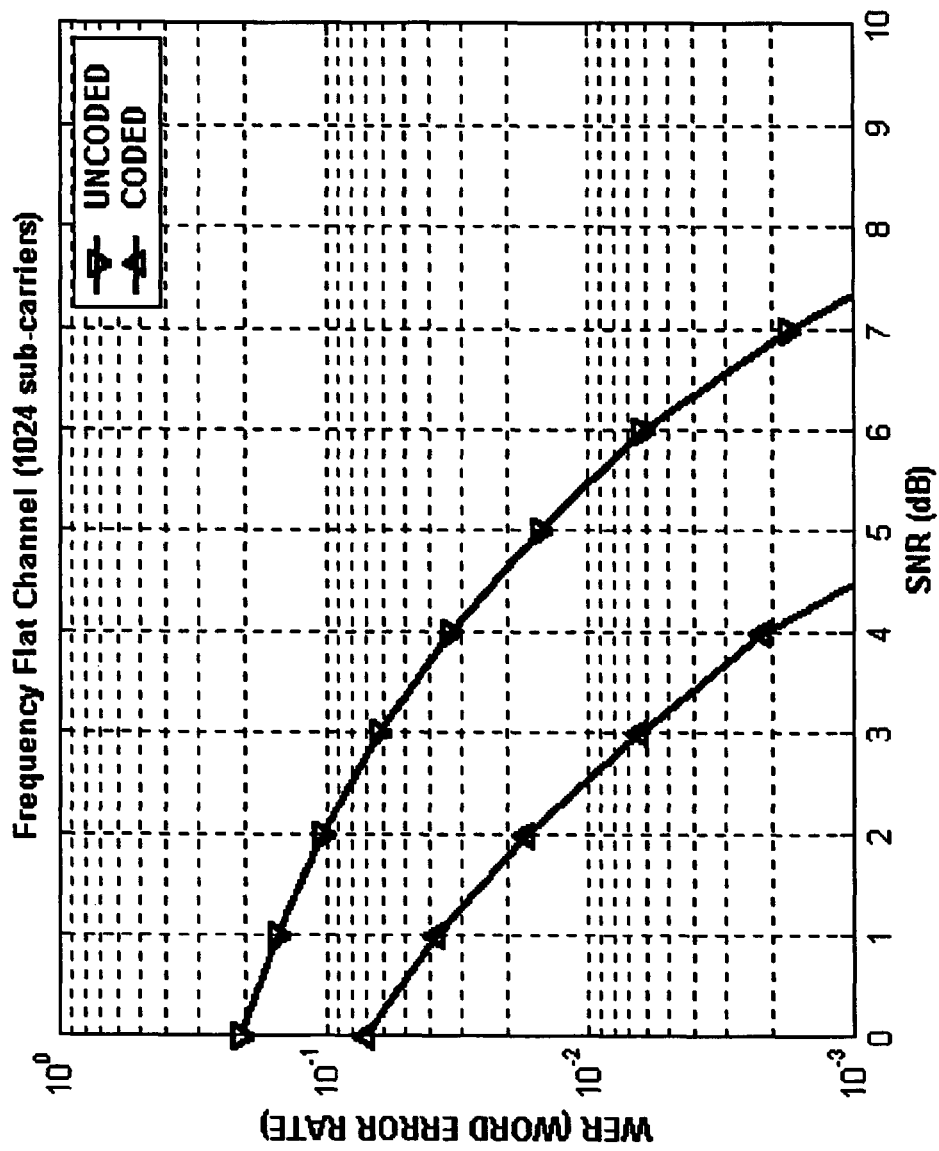
FIGS. 14(a) and 14(b) plot the word-error-rate performance of the 'word' $\{b_2, b_3, b_4\}$ for the frequency flat and frequency selective channels, respectively.
Figure 14B:
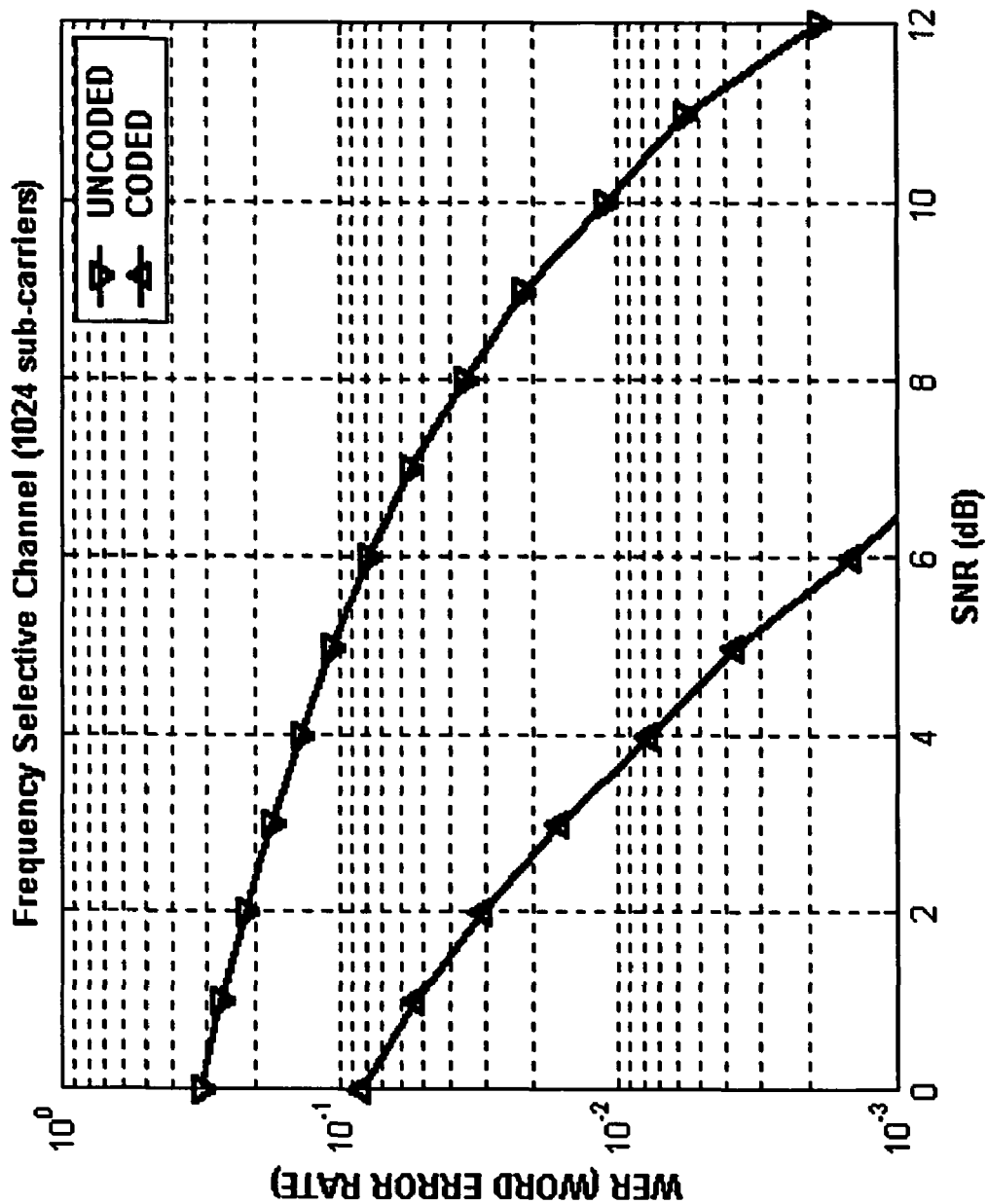

FIGS. 14(a) and 14(b) plot the word-error-rate (WER) performance of the 'word' $\{b_2, b_3, b_4\}$ of the present invention (the lines indicated by "CODED") for the frequency flat and frequency selective channels, respectively. For comparison, the results obtained using only the sequence $\{b_2, b_3, b_4\}$ for side information transmission through reserved sub-carriers $\{q_2, q_3, q_4\}$ (i.e., the conventional PTS method) are also plotted (the lines indicated by "UNCODED"). From FIGS. 14(a) and 14(b), it can be seen that the present invention provides about 3 dB and 6 dB coding gains over the conventional PTS method at WER=10$^{-3}$ for the frequency flat and frequency selective channels, respectively. These results therefore demonstrate the efficacy of the present invention.

Although the present invention has been described with reference to the preferred embodiments, it should be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for encoding and transmitting the side information related to peak-to-average power ratio (PAPR) reduction in a multicarrier system, comprising the steps of:
   (a) performing multicarrier modulation for data to be transmitted and generating a data modulated signal, then executing a procedure related to said PAPR reduction;
   (b) encoding said side information for generating coded side information;
   (c) allocating a plurality of sub-carriers for transmitting said coded side information;
   (d) performing multicarrier modulation for said coded side information and generating a side information modulated signal; and
   (e) attaching said side information modulated signal to said data modulated signal for generating a transmitted signal;
   wherein said PAPR reduction procedure is based on either a PAPR level of said data modulated signal or that of said transmitted signal to determine PAPR reduction parameters which are said side information.

2. The method for encoding and transmitting the side information related to PAPR reduction in a multicarrier system as claimed in claim 1, wherein said encoding said side information is implemented through an error-correction coding procedure.

3. The method for encoding and transmitting the side information related to PAPR reduction in a multicarrier system as claimed in claim 1, wherein said PAPR reduction procedure is a partial transmit sequence method.

4. The method for encoding and transmitting the side information related to PAPR reduction in a multicarrier system as claimed in claim 1, wherein said PAPR reduction procedure is based on the PAPR level of said data modulated signal, and said steps (b), (d), and (e) are performed after said PAPR reduction parameters have been determined.

5. The method for encoding and transmitting the side information related to PAPR reduction in a multicarrier system as claimed in claim 1, wherein said PAPR reduction procedure is based on the PAPR level of said transmitted signal, and said steps (b), (d), and (e) are performed during said PAPR reduction procedure.

6. A method for encoding and transmitting the side information related to peak-to-average power ratio (PAPR) reduction in a multicarrier system, comprising the steps of:
   (a) performing multicarrier modulation for data to be transmitted and generating a data modulated signal, then executing a procedure related to said PAPR reduction;
   (b) encoding said side information and generating two groups of coded side information;
   (c) allocating two groups of a plurality of sub-carriers for transmitting said two groups of coded side information respectively;
   (d) combining one of said two groups of coded side information with said data modulated signal;
   (e) modulating the other group of said two groups of coded side information and generating a side information modulated signal; and
   (f) attaching said side information modulated signal to said data modulated signal for generating a transmitted signal;
   wherein said PAPR reduction procedure is based on either a PAPR level of said data modulated signal or that of said transmitted signal.

7. The method for encoding and transmitting the side information related to PAPR reduction in a multicarrier system as claimed in claim 6, wherein said step (b) is implemented through an error-correction coding procedure and a parity-bit generation procedure.

8. The method for encoding and transmitting the side information related to PAPR reduction in a multicarrier system as claimed in claim 6, wherein said PAPR reduction procedure is based on either the PAPR level of said data modulated signal or that of said transmitted signal to determine PAPR reduction parameters.

9. The method for encoding and transmitting the side information related to PAPR reduction in a multicarrier system as claimed in claim 8, wherein said PAPR reduction parameters are said side information.

10. The method for encoding and transmitting the side information related to PAPR reduction in a multicarrier system as claimed in claim 6, wherein said PAPR reduction procedure is a partial transmit sequence method.

11. The method for encoding and transmitting the side information related to PAPR reduction in a multicarrier system as claimed in claim 8, wherein said PAPR reduction procedure is based on the PAPR level of said data modulated signal, and said steps (b), (e), and (f) are performed after said PAPR reduction parameters have been determined.

12. The method for encoding and transmitting the side information related to PAPR reduction in a multicarrier system as claimed in claim 9, wherein said PAPR reduction procedure is based on the PAPR level of said data modulated signal, and said steps (b), (e), and (f) are performed after said PAPR reduction parameters have been determined.

13. The method for encoding and transmitting the side information related to PAPR reduction in a multicarrier system as claimed in claim 8, wherein said PAPR reduction procedure is based on the PAPR level of said transmitted signal, and said steps (b), (e), and (f) are performed during said PAPR reduction procedure.

14. The method for encoding and transmitting the side information related to PAPR reduction in a multicarrier system as claimed in claim 9, wherein said PAPR reduction procedure is based on the PAPR level of said transmitted signal, and said steps (b), (e), and (f) are performed during said PAPR reduction procedure.

15. An apparatus for encoding and transmitting the side information related to peak-to-average power ratio (PAPR) reduction in a multicarrier system, comprising:
   a multicarrier modulator for modulating data onto multiple sub-carriers and generating a data modulated signal, wherein said multicarrier modulator comprises a PAPR reduction device to reduce a PAPR level of said data modulated signal and reserves a plurality of sub-carriers for encoding and transmitting said side information;

a side information coding and modulation device for coding and modulating said side information onto said plurality of sub-carriers and generating a side information modulated signal;

an adder for combining said data modulated signal and said side information modulated signal, and generating a transmitted signal; and a parameter control device for PAPR reduction for determining said side information according to the PAPR level of said data modulated signal.

16. The apparatus for encoding and transmitting the side information related to PAPR reduction in a multicarrier system as claimed in claim 15, wherein said parameter control device for PAPR reduction generates PAPR reduction parameters, and said PAPR reduction parameters are said side information.

17. The apparatus for encoding and transmitting the side information related to PAPR reduction in a multicarrier system as claimed in claim 16, wherein said multicarrier modulator generates said data modulated signal according to said PAPR reduction parameters and feedback to said parameter control device for PAPR reduction.

18. The apparatus for encoding and transmitting the side information related to PAPR reduction in a multicarrier system as claimed in claim 15, wherein said parameter control device for PAPR reduction determines said PAPR reduction parameters according to a PAPR reduction procedure, then said side information coding and modulation device refers to said PAPR reduction parameters as said side information for coding and modulating said side information onto said plurality of sub-carriers.

19. The apparatus for encoding and transmitting the side information related to PAPR reduction in a multicarrier system as claimed in claim 15, wherein said parameter control device for PAPR reduction determines said PAPR reduction parameters after phase optimization, and sends said PAPR reduction parameters to said side information coding and modulation device.

20. The apparatus for encoding and transmitting the side information related to PAPR reduction in a multicarrier system as claimed in claim 19, wherein said parameter control device for PAPR reduction comprises a phase mapper and a phase optimization unit, and said phase mapper provides said PAPR reduction parameters for said multicarrier modulator.

21. The apparatus for encoding and transmitting the side information related to PAPR reduction in a multicarrier system as claimed in claim 20, wherein said phase mapper is implemented by an encoder and an M-ary phase-shift keying (PSK) mapper, and said encoder is followed by said M-ary PSK mapper and proceeds with an error-correction coding of said PAPR reduction parameters.

22. The apparatus for encoding and transmitting the side information related to PAPR reduction in a multicarrier system as claimed in claim 21, said side information coding and modulation device further comprising:

a parity-bit generator for coding the output from said encoder and generating an encoded codeword;

a symbol mapper for mapping the encoded codeword from said parity-bit generator to a corresponding sequence; and a partial N-point Inverse Fast Fourier Transform (N-IFFT) for performing the modulation of N-IFFT according to the frequency arrangement of said corresponding sequence and generating said side information modulated signal.

23. The apparatus for encoding and transmitting the side information related to PAPR reduction in a multicarrier system as claimed in claim 15, said side information coding and modulation device further comprising:

an encoder for coding said side information from said phase optimization unit and generating an encoded codeword;

a symbol mapper for mapping the encoded codeword from said encoder to a corresponding sequence; and a partial N-point Inverse Fast Fourier Transform (N-IFFT) for performing the modulation of N-IFFT according to the frequency arrangement of said corresponding sequence and generating said side information modulated signal.

24. An apparatus for encoding and transmitting the side information related to peak-to-average power ratio (PAPR) reduction in a multicarrier system, comprising:

a multicarrier modulator for modulating data onto multiple sub-carriers and generating a data modulated signal, wherein said multicarrier modulator comprises a PAPR reduction device to reduce a PAPR level of said data modulated signal and reserves a plurality of sub-carriers for encoding and transmitting said side information;

a side information coding and modulation device for coding and modulating said side information onto said plurality of sub-carriers and generating a side information modulated signal;

an adder for combining said data modulated signal and said side information modulated signal, and generating a transmitted signal; and a parameter control device for PAPR reduction for determining said side information according to a PAPR level of said transmitted signal.

25. The apparatus for encoding and transmitting the side information related to PAPR reduction in a multicarrier system as claimed in claim 24, wherein said parameter control device for PAPR reduction generates PAPR reduction parameters, and said PAPR reduction parameters are said side information.

26. The apparatus for encoding and transmitting the side information related to PAPR reduction in a multicarrier system as claimed in claim 25, wherein said multicarrier modulator generates said data modulated signal according to said PAPR reduction parameters.

27. The apparatus for encoding and transmitting the side information related to PAPR reduction in a multicarrier system as claimed in claim 24, wherein said parameter control device for PAPR reduction determines said PAPR reduction parameters according to a PAPR reduction procedure, and during that time, said side information coding and modulation device refers to said PAPR reduction parameters as said side information for coding and modulating said side information onto said plurality of sub-carriers.

28. The apparatus for encoding and transmitting the side information related to PAPR reduction in a multicarrier system as claimed in claim 24, wherein said parameter control device for PAPR reduction selects said PAPR reduction parameters during phase optimization, and sends said PAPR reduction parameters to said side information coding and modulation device.

29. The apparatus for encoding and transmitting the side information related to PAPR reduction in a multicarrier system as claimed in claim 28, wherein said parameter control device for PAPR reduction comprises a phase mapper and a phase optimization unit, and said phase mapper provides said PAPR reduction parameters for said multicarrier modulator.

30. The apparatus for encoding and transmitting the side information related to PAPR reduction in a multicarrier system as claimed in claim 29, wherein said phase mapper is implemented by an encoder and an M-ary phase shift keying (PSK) mapper, and said encoder is followed by said M-ary PSK mapper and proceeds with an error-correction coding of said PAPR reduction parameters.

31. The apparatus for encoding and transmitting the side information related to PAPR reduction in a multicarrier system as claimed in claim 29, said side information coding and modulation device further comprising:
- a parity-bit generator for coding the output from said encoder and generating an encoded codeword;
- a symbol mapper for mapping the encoded codeword from said parity-bit generator to a corresponding sequence; and
- a partial N-point Inverse Fast Fourier Transform (N-IFFT) for performing the modulation of N-IFFT according to the frequency arrangement of said corresponding sequence and generating said side information modulated signal.

32. The apparatus for encoding and transmitting the side information related to PAPR reduction in a multicarrier system as claimed in claim 24, said side information coding and modulation device further comprising:
- an encoder for coding said side information from said phase optimization unit and generating an encoded codeword;
- a symbol mapper for mapping the encoded codeword from said encoder to a corresponding sequence; and
- a partial N-point Inverse Fast Fourier Transform (N-IFFT) for performing the modulation of N-IFFT according to the frequency arrangement of said corresponding sequence and generating said side information modulated signal.

* * * * *